(12) United States Patent
Yamaguchi et al.

(10) Patent No.: US 12,187,931 B2
(45) Date of Patent: Jan. 7, 2025

(54) RELEASE FILM FOR PRESSURE-SENSITIVE SILICONE ADHESIVE AND PRODUCTION METHOD THEREFOR

(71) Applicant: SHIN-ETSU CHEMICAL CO., LTD., Tokyo (JP)

(72) Inventors: Koichi Yamaguchi, Annaka (JP); Yuji Yamane, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 1112 days.

(21) Appl. No.: 17/050,039

(22) PCT Filed: Apr. 4, 2019

(86) PCT No.: PCT/JP2019/014903
§ 371 (c)(1),
(2) Date: Oct. 23, 2020

(87) PCT Pub. No.: WO2019/208141
PCT Pub. Date: Oct. 31, 2019

(65) Prior Publication Data
US 2021/0238453 A1  Aug. 5, 2021

(30) Foreign Application Priority Data
Apr. 24, 2018  (JP) ................. 2018-082740

(51) Int. Cl.
| | | |
|---|---|---|
| *B32B 27/00* | (2006.01) | |
| *C08G 65/00* | (2006.01) | |
| *C08G 65/22* | (2006.01) | |
| *C08G 65/336* | (2006.01) | |
| *C08G 77/00* | (2006.01) | |
| *C08G 77/14* | (2006.01) | |
| *C09J 7/38* | (2018.01) | |
| *C09J 7/40* | (2018.01) | |
| *C09J 7/50* | (2018.01) | |

(52) U.S. Cl.
CPC ............ *C09J 7/401* (2018.01); *B32B 27/00* (2013.01); *C08G 65/007* (2013.01); *C08G 65/226* (2013.01); *C08G 65/336* (2013.01); *C08G 77/00* (2013.01); *C08G 77/14* (2013.01); *C09J 7/38* (2018.01); *C09J 7/40* (2018.01); *C09J 7/403* (2018.01); *C09J 7/50* (2018.01); *C09J 2427/005* (2013.01); *C09J 2483/003* (2013.01)

(58) Field of Classification Search
None
See application file for complete search history.

(56) References Cited

U.S. PATENT DOCUMENTS

| | | | |
|---|---|---|---|
| 4,736,048 A | 4/1988 | Brown et al. | |
| 4,985,526 A | 1/1991 | Kishita et al. | |
| 10,035,812 B2 | 7/2018 | Yamane et al. | |
| 10,563,070 B2 | 2/2020 | Mitsuhashi et al. | |
| 2007/0149746 A1 | 6/2007 | Yamane et al. | |
| 2007/0197758 A1 | 8/2007 | Yamane et al. | |
| 2008/0071042 A1 | 3/2008 | Yamane et al. | |
| 2010/0029889 A1 | 2/2010 | Yamane et al. | |
| 2010/0076211 A1 | 3/2010 | Yamane et al. | |
| 2011/0098402 A1 | 4/2011 | Yamane et al. | |
| 2013/0136928 A1* | 5/2013 | Yamane ............... | C09D 183/12 428/421 |
| 2014/0113145 A1 | 4/2014 | Yamane et al. | |
| 2014/0147665 A1 | 5/2014 | Tanaka et al. | |
| 2014/0302332 A1 | 10/2014 | Murotani et al. | |
| 2015/0337430 A1 | 11/2015 | Yoshida et al. | |
| 2019/0177574 A1* | 6/2019 | Takeda ................. | C08G 77/54 |

FOREIGN PATENT DOCUMENTS

| | | | |
|---|---|---|---|
| JP | 4-76391 B2 | | 12/1992 |
| JP | 5-7434 B2 | | 1/1993 |
| JP | 10-288216 A | | 10/1998 |
| JP | 2005319723 A | * | 11/2005 |
| JP | 2007-197425 A | | 8/2007 |
| JP | 2007-297543 A | | 11/2007 |
| JP | 2007-297589 A | | 11/2007 |
| JP | 2008-88412 A | | 4/2008 |
| JP | 2008-144144 A | | 6/2008 |
| JP | 2009-255294 A | | 11/2009 |
| JP | 2010-31184 A | | 2/2010 |
| JP | 2010-47516 A | | 3/2010 |
| JP | 2011-116947 A | | 6/2011 |
| JP | 2011-178835 A | | 9/2011 |
| JP | 2012-122024 A | | 6/2012 |
| JP | 2012-158619 A | | 8/2012 |
| JP | 2013-253228 A | | 12/2013 |
| JP | 2014-84405 A | | 5/2014 |
| JP | 2014-105235 A | | 6/2014 |
| JP | 2014-218639 A | | 11/2014 |

(Continued)

OTHER PUBLICATIONS

International Search Report, issued in PCT/JP2019/014903, dated Jun. 25, 2019.

(Continued)

*Primary Examiner* — Ramsey Zacharia
(74) *Attorney, Agent, or Firm* — Birch, Stewart, Kolasch & Birch, LLP

(57) ABSTRACT

A release film for pressure-sensitive silicone adhesives which comprises: any of various bases; a primer layer (first layer) disposed on at least one surface of the base, the primer layer having a specific thickness and comprising as a main component an organosilicon compound having a plurality of silanol groups in the molecule; and a release layer (second layer) disposed on the outer surface of the primer layer, the release layer having a specific thickness and comprising as a main component a cured object obtained from a hydrolyzable fluorinated compound. A release coating film having excellent releasing properties can be stably and easily imparted to various bases, and the primer layer and the release layer can be formed even by room-temperature (25° C.) application.

12 Claims, No Drawings

(56) References Cited

FOREIGN PATENT DOCUMENTS

| | | |
|---|---|---|
| JP | 2015-74201 A | 4/2015 |
| JP | 2017-7294 A | 1/2017 |
| WO | WO 2009/131057 A1 | 10/2009 |
| WO | WO 2010/038648 A1 | 4/2010 |
| WO | WO2013/121984 A1 | 8/2013 |
| WO | WO 2014/097388 A1 | 6/2014 |
| WO | WO-2018034138 A1 * | 2/2018 ............. C03C 17/30 |

OTHER PUBLICATIONS

Written Opinion of the International Searching Authority, issued in PCT/JP2019/014903, dated Jun. 25, 2019.

* cited by examiner

RELEASE FILM FOR PRESSURE-SENSITIVE SILICONE ADHESIVE AND PRODUCTION METHOD THEREFOR

TECHNICAL FIELD

This invention relates to a release film adapted for silicone pressure-sensitive adhesive (PSA) and a method for preparing the same. More particularly, it relates to a release film adapted for silicone PSA having a primer layer formed between a substrate and a release layer using an organosilicon compound having a plurality of silanol groups (i.e., silicon-bonded hydroxyl groups), and a method for preparing the same.

BACKGROUND ART

For the purpose of inhibiting adhesion or bonding between substrates such as paper sheets or plastic films and pressure-sensitive adhesive materials, it is a common practice in the art to form a cured film of silicone composition on the surface of a substrate to impart release properties. This is generally known as release liner or paper.

Of the pressure-sensitive adhesive materials, silicone based PSAs composed mainly of organopolysiloxane are used in a wide variety of applications because of their heat resistance, freeze resistance, chemical resistance, electric insulation, and low toxicity. Since silicone based PSAs have a very strong bonding force, in order that PSA tapes or labels having the PSAs coated on substrates readily peel from the substrates, the silicone cured films formed on the substrates must have excellent parting properties.

There are known silicone compositions providing silicone cured films having excellent parting properties. For example, Patent Document 1 (JP-B H05-007434) proposes a composition comprising an organopolysiloxane having a fluorinated substituent group of the formula: $C_nF_{2n+1}CH_2CH_2$— wherein n is an integer of at least 1. Patent Document 2 (JP-B H04-076391) proposes a composition comprising an organopolysiloxane having a fluorinated substituent group of the formula: $F[CF(CF_3)CF_2O]_nCF(CF_3)CF_2OCH_2CH_2CH_2$— wherein n is an integer of 1 to 5.

These silicone compositions have relatively low release forces to silicone based PSAs, but experience an outstanding change to tight release with a lapse of time. Although tight release forces are required to impart different release forces to opposed surfaces of carrier materials and double side PSA tapes, the silicone compositions cannot be used in such applications partially because release force controlling agents as used in silicone compositions for conventional release liners are not available.

The following documents are cited as the prior art technology relating to the present invention.

PRIOR ART DOCUMENTS

Patent Documents

Patent Document 1: JP-B H05-007434
Patent Document 2: JP-B H04-076391
Patent Document 3: JP-A 2011-116947
Patent Document 4: WO 2014/097388
Patent Document 5: WO 2010/038648
Patent Document 6: JP-A 2007-197425
Patent Document 7: JP-A 2007-297589
Patent Document 8: JP-A 2007-297543
Patent Document 9: JP-A 2008-088412
Patent Document 10: JP-A 2008-144144
Patent Document 11: JP-A 2010-031184
Patent Document 12: JP-A 2010-047516
Patent Document 13: JP-A 2011-178835
Patent Document 14: JP-A 2014-084405
Patent Document 15: JP-A 2014-105235
Patent Document 16: JP-A 2013-253228
Patent Document 17: JP-A 2014-218639
Patent Document 18: WO 2013/121984

SUMMARY OF INVENTION

Technical Problem

An object of the invention, which has been made under the above-mentioned circumstances, is to provide a release film adapted for silicone PSA which experiences a minimal change with time of release force, minimizes the migration with time from a release layer to PSA even when the release layer is thin, and enables to control the release force from easy release to tight release depending on an intended application; and a method for preparing a release film adapted for silicone PSA by depositing a release layer having high stability on any one of various substrates by the wet or dry technique.

Solution to Problem

Making extensive investigations to attain the above object, the inventors have found that a release film adapted for silicone PSA in which a primer layer composed mainly of an organosilicon compound having a plurality of silanol groups per molecule and having a specific thickness is disposed on at least one surface of any one of various substrates as a first layer, and a release layer composed mainly of a cured product of a hydrolyzable fluorinated compound and having a specific thickness is disposed on the outer surface of the primer layer as a second layer, is obtained by a method comprising the steps of wet coating a solution of an organosilicon compound having a plurality of silanol groups per molecule in a solvent onto at least one surface of a substrate, drying the solvent to form and lay a primer layer on the at least one surface of a substrate, wet coating a solution of a hydrolyzable fluorinated compound in a solvent onto the outer surface of the primer layer and then drying the solvent, or providing a solution of a hydrolyzable fluorinated compound in a solvent, evaporating off the solvent, and dry coating the hydrolyzable fluorinated compound to the outer surface of the primer layer, and curing the hydrolyzable fluorinated compound to form and lay a release layer on the outer surface of the primer layer; that the release film can endow various substrates with a release coating having improved release properties in a consistent simple manner; and that the primer layer and the release layer can be coated by the room temperature (25° C.) process. The invention is predicated on this finding.

Accordingly, the invention provides a release film adapted for silicone PSA and a method for preparing the same, as defined below.

[1]

A release film adapted for silicone pressure-sensitive adhesive, comprising a substrate, a primer layer disposed on at least one surface of the substrate as a first layer, and a release layer disposed on the outer surface of the primer layer as a second layer, the primer layer being composed mainly of an organosilicon compound having a plurality of silanol groups per molecule and having a thickness of 0.5 to 500 nm,
the release layer being composed mainly of a cured product of a hydrolyzable fluorinated compound and having a thickness of 0.5 to 30 nm.

[2]
The release film of [1] wherein the organosilicon compound having a plurality of silanol groups per molecule is a hydrolytic partial condensate of a tetraalkoxysilane.

[3]
The release film of [1] or [2] wherein the hydrolyzable fluorinated compound has at least one hydrolyzable silyl group at one or more molecular chain ends, the hydrolyzable silyl group being selected from among silyl groups having $C_{1-12}$ alkoxy, $C_{2-12}$ alkoxyalkoxy, $C_{1-10}$ acyloxy, $C_{2-10}$ alkenyloxy, halogen or amino, and silazane groups.

[4]
The release film of any one of [1] to [3] wherein the hydrolyzable fluorinated compound is a fluorooxyalkylene group-containing organosilicon compound having per molecule a divalent linear perfluorooxyalkylene polymer residue: $-(CF_2)_d-O-(CF_2O)_p(CF_2CF_2O)_q(CF_2CF_2CF_2O)_r(CF_2CF_2CF_2CF_2O)_s(CF(CF_3)CF_2O)_t-(CF_2)_d-$ wherein p, q, r, s and t are each independently an integer of 0 to 200, p+q+r+s+t is 3 to 500, each repeating unit in parentheses with subscripts p, q, r, s and t may be randomly arranged, d is independently an integer of 0 to 8, the unit with d may be linear or branched, the organosilicon compound further having at least one hydrolyzable silyl group at one or more molecular chain ends.

[5]
The release film of any one of [1] to [4] wherein the hydrolyzable fluorinated compound is at least one compound selected from hydrolyzable fluorinated organosilicon compounds having the general formulae (1) to (5):

$$(A\text{-}Rf)_\alpha-ZW_\beta \tag{1}$$

$$Rf-(ZW_\beta)_2 \tag{2}$$

$$Z'-(Rf-ZW_\beta)_\gamma \tag{3}$$

wherein Rf is a divalent linear perfluorooxyalkylene polymer residue: $-(CF_2)_d-O-(CF_2O)_p(CF_2CF_2O)_q(CF_2CF_2CF_2O)_r(CF_2CF_2CF_2CF_2O)_s(CF(CF_3)CF_2O)_t-(CF_2)_d-$, p, q, r, s, and t are each independently an integer of 0 to 200, p+q+r+s+t is 3 to 500, each repeating unit in parentheses with subscripts p, q, r, s and t may be randomly arranged, d is independently an integer of 0 to 8, the unit with d may be linear or branched, A is fluorine, hydrogen or a monovalent fluorinated group terminated with $-CF_3$, $-CF_2H$ or $-CH_2F$ group, Z and Z' are each independently a single bond, or a di- to octavalent organic group which may contain nitrogen, oxygen, silicon, phosphorus or sulfur and which may be fluorinated, W is a monovalent organic group terminated with a hydrolyzable group, α and β are each independently an integer of 1 to 7, α+β is 2 to 8, and γ is an integer of 2 to 8, $$A\text{-}Rf\text{-}Q\text{-}(Y)_\delta-B \tag{4}$$

$$Rf\text{-}(Q\text{-}(Y)_\delta-B)_2 \tag{5}$$

wherein Rf and A are as defined above, Q is a single bond or divalent organic group, δ is each independently an integer of 1 to 10, Y is a divalent organic group having a hydrolyzable group, and B is hydrogen, $C_{1-4}$ alkyl or halogen.

[6]
The release film of [5] wherein the hydrolyzable fluorinated organosilicon compounds are the following:

[Chem. 1]

$CF_3O-(CF_2CF_2O)_{\overline{q1}}(CF_2CF_2CF_2CF_2O)_{\overline{s1}}CF_2CF_2CF_2-C_2H_4-Si(OMe)_3$

[Chem. 2]

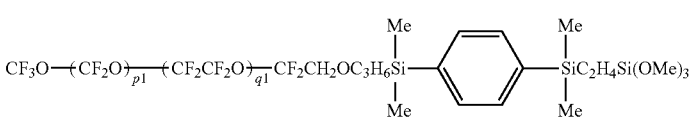

[Chem. 3]

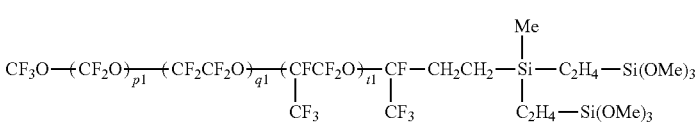

[Chem. 4]

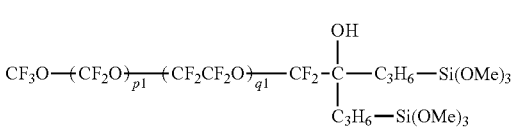

[Chem. 5]

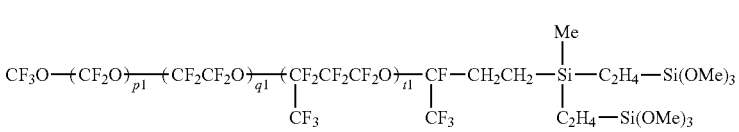

[Chem. 6]

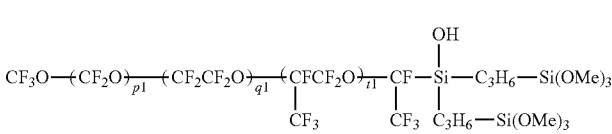

-continued
[Chem. 7]
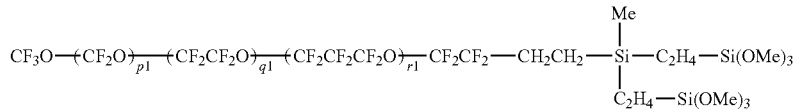
[Chem. 8]
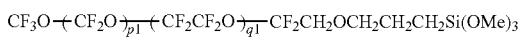
[Chem. 9]
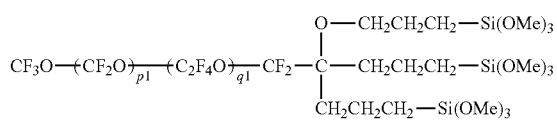
[Chem. 10]
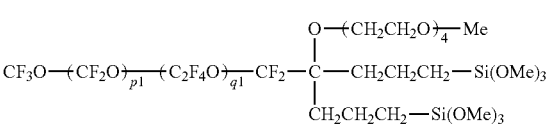
[Chem. 11]
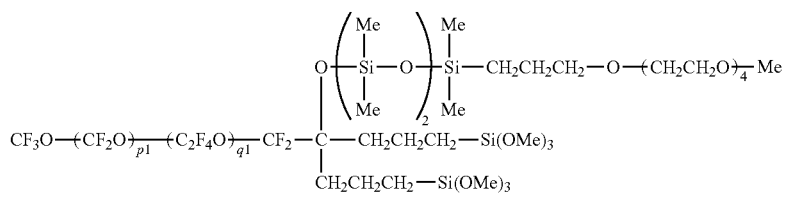
[Chem. 12]
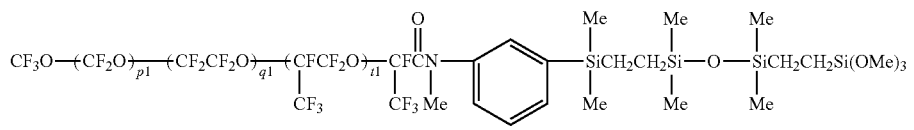
[Chem. 13]
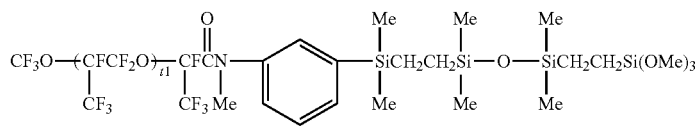
[Chem. 14]
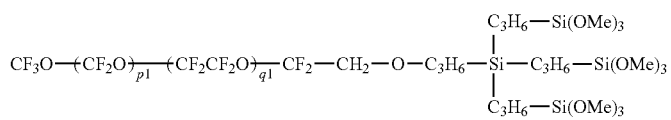
[Chem. 15]
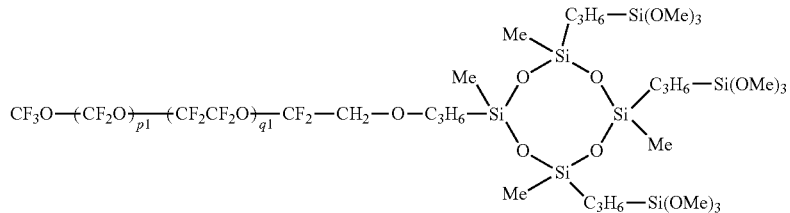
[Chem. 16]
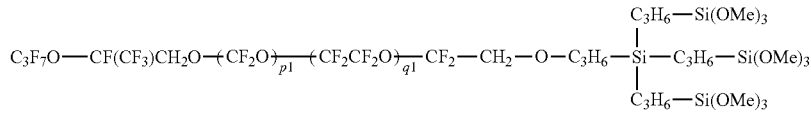
[Chem. 17]
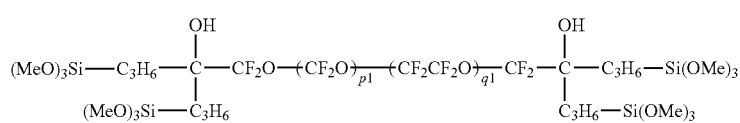

[Chem. 18]
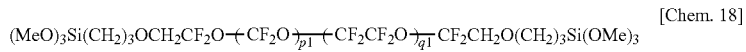
5
[Chem. 19]
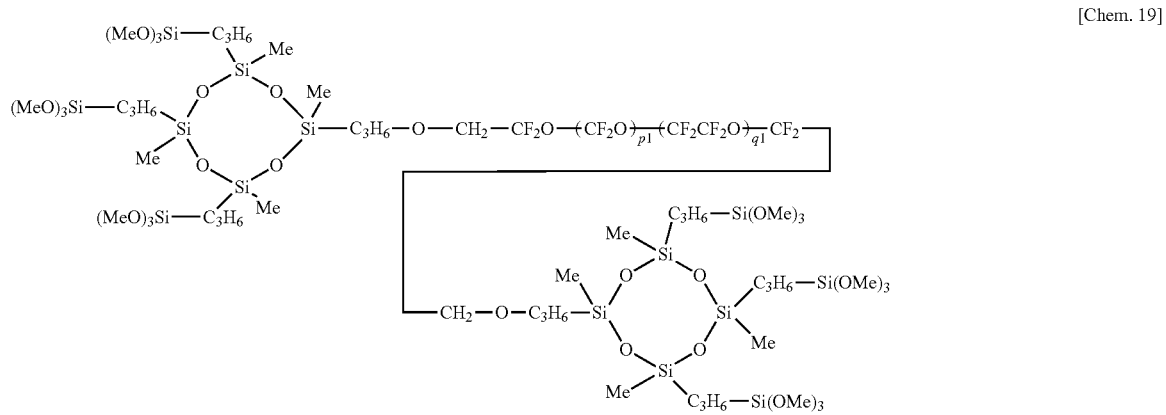
[Chem. 20]
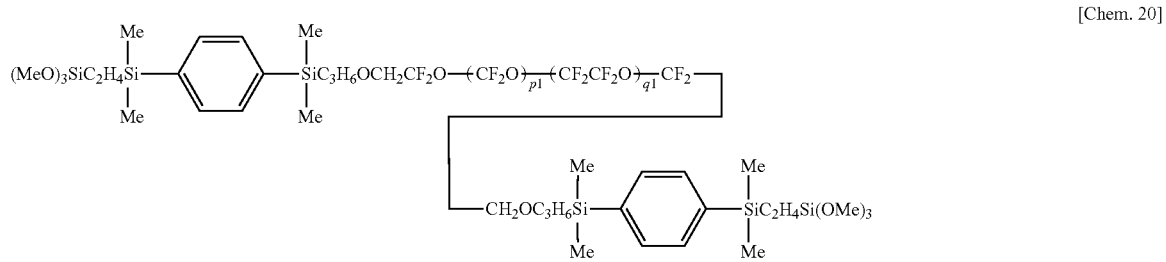
[Chem. 21]
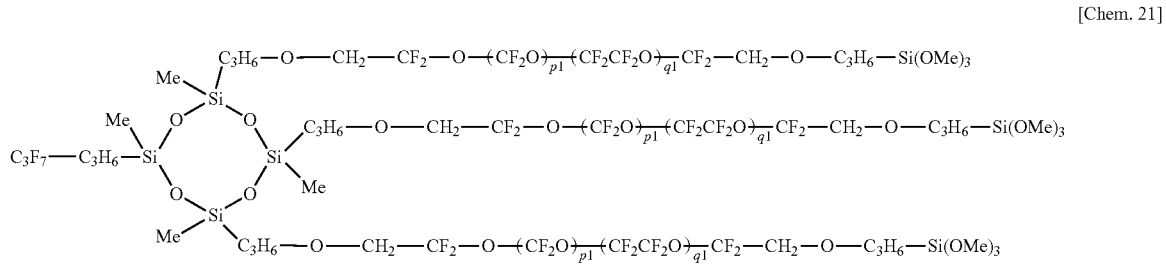
[Chem. 22]
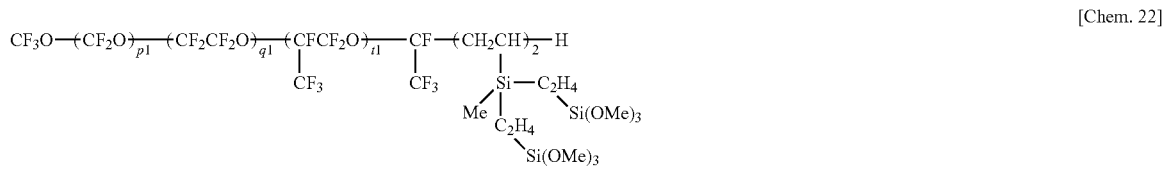
[Chem. 23]
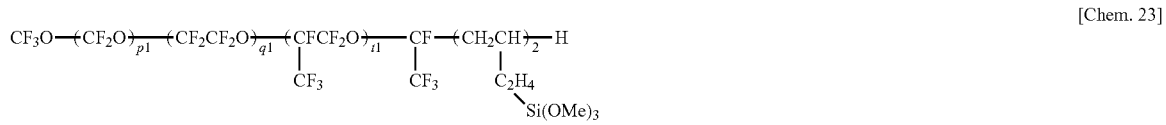
[Chem. 24]
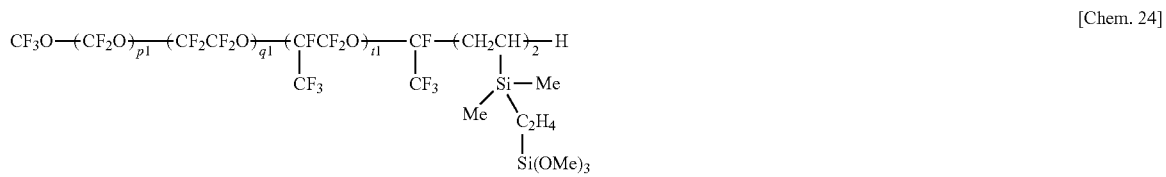

-continued

[Chem. 25]
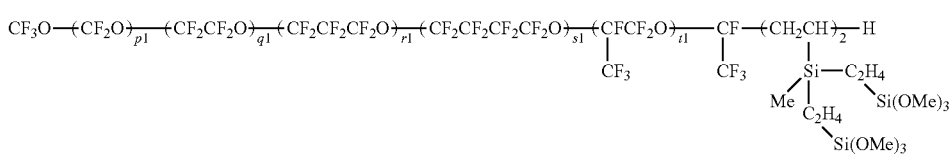

[Chem. 26]
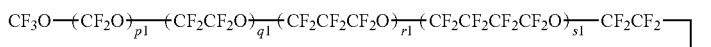

[Chem. 27]

[Chem. 28]

[Chem. 29]
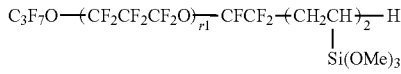

[Chem. 30]
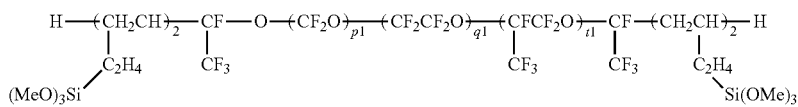

wherein Me is methyl, p1, q1, r1, s1, and t1 are each independently an integer of 1 to 200, the sum of p1, q1, r1, s1, and t1 is 3 to 500, each unit in parentheses with subscripts p1, q1, r1, s1, and t1 may be randomly arranged.

[7]

The release film of any one of [1] to [6] wherein the release layer contains the cured product of a hydrolyzable fluorinated compound and a nonfunctional fluorinated compound.

[8]

The release film of any one of [1] to [7] wherein the substrate is of a resin, paper or metal.

[9]

A method for preparing the release film of any one of [1] to [8], comprising the steps of:
  wet coating a solution of an organosilicon compound having a plurality of silanol groups per molecule in a solvent onto at least one surface of a substrate,
  drying the solvent to form and lay a primer layer on the at least one surface of a substrate,
  wet coating a solution of a hydrolyzable fluorinated compound in a solvent onto the outer surface of the primer layer and then drying the solvent, or providing a solution of a hydrolyzable fluorinated compound in a solvent, evaporating off the solvent, and dry coating the hydrolyzable fluorinated compound to the outer surface of the primer layer, and
  curing the hydrolyzable fluorinated compound to form and lay a release layer on the outer surface of the primer layer.

Advantageous Effects of Invention

According to the invention, there is provided a release film adapted for silicone PSA having a release surface with improved release properties tightly adhered thereto. The method for preparing the release film enables to form the relevant layer by the wet process (e.g., brush coating, spin coating, spraying, gravure coating, die coating, bar coating or slit coating) without resorting essentially to the vacuum process or high-temperature heating process. Since the release film presents a release surface exhibiting easy/tight release properties with a minimal change with time, to silicone PSA, it is useful in the heretofore difficult application, especially the release film application such as differential peel strength release film or double sided tape for carrier-less silicone PSA sheets.

DESCRIPTION OF EMBODIMENTS

Now the invention is described in detail.
The invention provides a release film adapted for silicone pressure-sensitive adhesive (PSA), comprising a substrate, a primer layer disposed on at least one surface, preferably one surface of the substrate as a first layer, and a release layer disposed on the outer surface of the primer layer as a second layer. The primer layer is composed mainly of an organosilicon compound having a plurality of silanol groups per molecule and has a thickness of 0.5 to 500 nm. The release layer is composed mainly of a cured product of a hydrolyzable fluorinated compound and has a thickness of 0.5 to 30 nm.

According to the invention, a release film adapted for silicone PSA comprising any one of various substrates, a primer layer disposed on the surface of the substrate, composed mainly of an organosilicon compound having a plurality of silanol groups per molecule and having a thickness of 0.5 to 500 nm as a first layer, and a release layer disposed on the surface of the primer layer, composed mainly of a cured product of a hydrolyzable fluorinated compound and having a thickness of 0.5 to 30 nm as a second layer, is obtained, for example, by a method comprising the steps of wet coating a solution of an organosilicon compound having a plurality of silanol groups per molecule in a solvent onto a surface (at least one surface) of a substrate, drying the solvent to form and lay a primer layer as a first layer, wet coating a solution (release agent) of a hydrolyzable fluorinated compound in a solvent onto the primer layer and then drying the solvent, or providing a solution of a hydrolyzable fluorinated compound in a solvent, evaporating off the solvent, and dry coating the hydrolyzable fluorinated compound onto the primer layer, and curing the hydrolyzable fluorinated compound to form and lay a release layer as a second layer.

The substrate which can be used herein is not particularly limited and is preferably selected from resins, papers, and metals. Examples include plastic films and sheets made of synthetic resins, for example, polyesters such as polyethylene terephthalate, polypropylene, polyethylene, polyvinyl chloride, polytetrafluoroethylene, and polyimides, paper substrates such as glassine paper, kraft paper and clay-coated paper, laminated paper substrates such as polyethylene-laminated wood-free paper and polyethylene-laminated kraft paper, and metal foils such as aluminum and copper foils. Of these, polyester films such as polyethylene terephthalate and polyimide films are preferred.

The substrate has a thickness which is preferably 10 to 200 µm, more preferably 25 to 125 µm, though not particularly limited. Herein, the thickness of a substrate may be measured by a micrometer or the like.

The primer layer formed and laid on at least one surface of the substrate as a first layer is composed mainly of an organosilicon compound having a plurality of silanol groups per molecule, preferably at least 50% by weight of the organosilicon compound, and has a thickness of 0.5 to 500 nm.

The primer layer or first layer may be formed or laid by wet coating a solution of an organosilicon compound having a plurality of silanol groups per molecule in a solvent onto at least one surface of a substrate, and drying the solution to remove the solvent.

The organosilicon compound having a plurality of silanol groups per molecule should preferably have at least 2, more preferably at least 3, and even more preferably at least 4 silanol groups per molecule. If the number of silanol groups per molecule is too small, the coating itself may be weak. It is noted that the organosilicon compound having a plurality of silanol groups per molecule means an organosilicon compound (preferably organopolysiloxane compound) having a silanol content or concentration of at least 0.0001 mol/g. Often, the organosilicon compound preferably has a silanol content of 0.0001 to 0.05 mol/g, more preferably 0.001 to 0.04 mol/g, and even more preferably 0.005 to 0.03 mol/g.

The organosilicon compound having a plurality of silanol groups per molecule may be obtained from hydrolysis and partial condensation of an organosilicon compound having per molecule a plurality of hydrolyzable groups such as alkoxy groups, e.g., methoxy and ethoxy or halogen atoms, e.g., chlorine.

Examples of the organosilicon compound having a plurality of hydrolyzable groups per molecule include methyltrimethoxysilane, dimethyldimethoxysilane, phenyltrimethoxysilane, dimethoxydiphenylsilane, tetramethoxysilane, tetraethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, decyltrimethoxysilane, 1,6-bis(trimethoxysilyl)hexane, trifluoropropyltrimethoxysilane, vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, tris(trimethoxysilylpropyl) isocyanurate, trichlorosilane, and dichlorosilane, which may be used in admixture of two or more.

By hydrolyzing an organosilane or organosilicon compound having a plurality of hydrolyzable groups as mentioned above, and effecting partial dehydrating condensation (or partial condensation) to a higher molecular weight, there is obtained an organosilicon compound having a plurality of silanol groups per molecule (i.e., a hydrolytic partial condensate of an organosilicon compound having a plurality of hydrolyzable groups). As used herein, the partial condensate means an organopolysiloxane compound having a plurality of residual silanol groups per molecule, which is obtained from partial dehydrating condensation of an organosilane having a plurality of silanol groups (silicon-bonded hydroxyl groups) per molecule or derivative thereof, which is obtained from hydrolysis of an organosilane or organosilicon compound having a plurality of hydrolyzable groups as mentioned above.

The hydrolytic partial condensate of an organosilicon compound having a plurality of hydrolyzable groups per molecule should preferably have a weight average molecular weight (Mw) of 300 to 100,000, more preferably 5,000 to 50,000. As used herein, the Mw may be determined, for example, by gel permeation chromatography (GPC) using toluene as developing solvent versus polystyrene standards (the same holds true, hereinafter).

Most preferably, the organosilicon compound having a plurality of silanol groups per molecule is a hydrolytic partial condensate of a tetraorganosilane such as tetramethoxysilane or tetraethoxysilane.

The organosilicon compound having a plurality of silanol groups per molecule is desirably diluted with a solvent. Preferred examples of the solvent for diluting the organosilicon compound having a plurality of silanol groups per molecule include alcohols such as methanol, ethanol, isopropanol and butanol, and ethers such as propylene glycol monomethyl ether and polyethylene glycol monopropyl ether, but are not limited thereto. An appropriate solvent may be selected in view of substrate wetting and boiling point.

The solution of the organosilicon compound having a plurality of silanol groups per molecule in a solvent should preferably contain the organosilicon compound in a concentration of 0.01 to 10% by weight, more preferably 0.1 to 2% by weight. If the concentration is too low, more portions may be left uncoated. If the concentration is too high, secondary agglomeration can take place between silanol groups.

In the solution of the organosilicon compound having a plurality of silanol groups per molecule in a solvent, additives such as UV absorbers, light stabilizers, antioxidants, leveling agents, anti-foaming agents, pigments, dyes, dispersants, antistatic agents, anti-fogging agents, and surfactants may be used if necessary. The additive is preferably added in such amounts that the primer layer obtained by removing the solvent from the solution may contain the organosilicon compound having a plurality of silanol groups per molecule in an amount of at least 50% by weight, specifically 50 to 100% by weight, more preferably 80 to 100% by weight, that is, the optional additive in an amount of up to 50% by weight, specifically 0 to 50% by weight, more preferably 0 to 20% by weight.

A primer layer composed mainly of the organosilicon compound having a plurality of silanol groups per molecule may be formed by coating the solution of the organosilicon compound having a plurality of silanol groups per molecule in a solvent onto a substrate surface by a wet coating process, specifically dipping, brush coating, spin coating, spray coating, gravure coating, die coating, bar coating, slit coating or flow coating, and then drying off the solvent. If desired, the coating may be heated at a temperature in the range which does not affect the substrate, for example, at 40 to 500° C. for 1 minute to 24 hours.

The primer layer or first layer formed and laid on at least one surface of the substrate typically has a thickness of 0.5 to 500 nm, preferably 3 to 200 nm, more preferably 10 to 100 nm although the thickness is selected as appropriate depending on the type of substrate. As used herein, the thickness may be measured by any well-known methods such as spectral ellipsometry and X-ray reflection method (the same holds true, hereinafter).

Next, a release layer is formed and laid on the surface of the primer layer as a second layer, the release layer being composed mainly of a cured product of a hydrolyzable fluorinated compound and having a thickness of 0.5 to 30 nm.

The release layer (or second layer) may be formed and laid, for example, by coating a solution (i.e., release agent) of a hydrolyzable fluorinated compound in a solvent onto the outer surface of the primer layer (first layer) and curing the coating.

The hydrolyzable fluorinated compound used herein may be selected from the hydrolyzable fluorinated organosilicon compounds described in JP-A 2007-197425, JP-A 2007-297589, JP-A 2007-297543, JP-A 2008-088412, JP-A 2008-144144, JP-A 2010-031184, JP-A 2010-047516, JP-A 2011-116947, JP-A 2011-178835, JP-A 2014-084405, JP-A 2014-105235, JP-A 2013-253228, JP-A 2014-218639, and WO 2013/121984 (Patent Documents 3, 6 to 18).

The hydrolyzable fluorinated compound is described in further detail.

The hydrolyzable fluorinated compound has at least one, preferably 1 to 6, more preferably 2 to 4 hydrolyzable silyl groups at 1 or more, preferably 1 to 14, more preferably 1 to 7 molecular chain ends (e.g., at least one, preferably 2 to 60, more preferably 3 to 30 hydrolyzable silyl groups per molecule). Preferably the hydrolyzable fluorinated compound contains in the molecule a hydrolyzable silyl group which is selected from among silyl groups containing a $C_{1-12}$, especially $C_{1-10}$ alkoxy moiety such as methoxy, ethoxy, propoxy or butoxy, $C_{2-12}$, especially $C_{2-10}$ alkoxyalkoxy moiety such as methoxymethoxy or methoxyethoxy, $C_{1-10}$ acyloxy moiety such as acetoxy, $C_{2-10}$ alkenyloxy moiety such as isopropenoxy, halogen (e.g., chloro, bromo or iodo) or amino, and silazane groups, and has a fluorine atom(s).

The hydrolyzable fluorinated compound is preferably a compound having a fluorooxyalkylene group (i.e., mono- or divalent perfluoropolyether residue) in the molecule. The fluorooxyalkylene group refers to a compound of (poly)fluorooxyalkylene structure (i.e., divalent linear perfluorooxyalkylene polymer residue) having a plurality of repeating units: $-C_jF_{2j}O-$ bonded wherein j is an integer of at least 1, preferably 1 to 6, more preferably 1 to 4. Especially, the structure may have 3 to 500, preferably 15 to 200, more preferably 20 to 100, even more preferably 25 to 80 repeating units.

The repeating units: $-C_jF_{2j}O-$ may be linear or branched. Examples include the following units while repeating units of more than one type may be bonded.

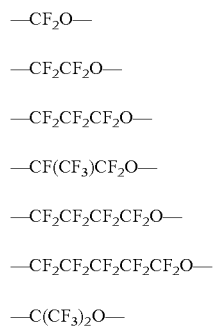

Most preferably, the (poly)fluorooxyalkylene structure (i.e., divalent linear perfluorooxyalkylene polymer residue) is $-(CF_2)_d-O-(CF_2O)_p(CF_2CF_2O)_q(CF_2CF_2CF_2O)_r(CF_2CF_2CF_2CF_2O)_s(CF(CF_3)CF_2O)_t-(CF_2)_d-$, wherein p, q, r, s, and t are each independently an integer of 0 to 200, preferably p is an integer of 5 to 100, q is an integer of 5 to 100, r is an integer of 0 to 100, s is an integer of 0 to 50, t is an integer of 0 to 100, and p+q+r+s+t is an integer of 3 to 500, preferably an integer of 10 to 105. Each repeating unit in parentheses with subscripts p, q, r, s, and t may be randomly arranged. The subscript d is independently an integer of 0 to 8, preferably an integer of 0 to 5, more preferably an integer of 0 to 2, and the unit with d may be linear or branched. Specific examples are shown by the following structures.

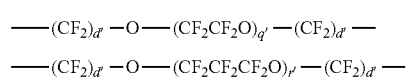

[Chem. 31]

-continued

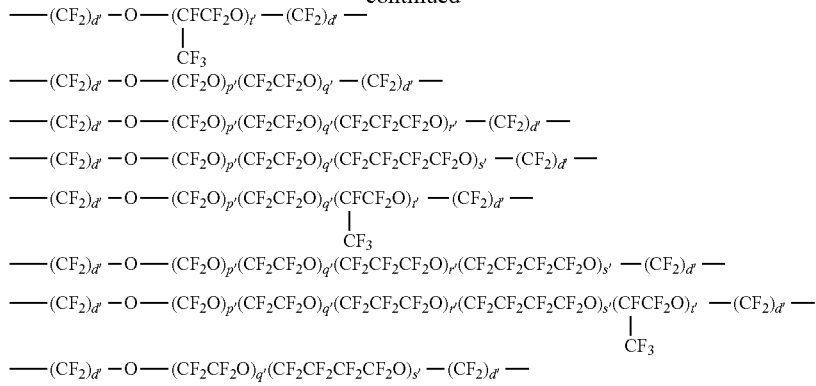

Herein p', q', r', s', and t' are each independently an integer of 1 to 200, the sum of p', q', r', s', and t' is 3 to 500, each repeating unit in parentheses with subscripts p', q', r', s', and t' may be randomly arranged, d' is independently an integer of 0 to 5, and the unit with d' may be linear or branched.

More preferably, the hydrolyzable fluorinated compound used herein is a hydrolyzable fluorinated organosilicon compound (or hydrolyzable fluorine-containing organosilicon compound) having any one of the general formulae (1) to (5). The compounds may be used alone or in admixture.

$$(A\text{-}Rf)_\alpha\text{—}ZW_\beta \quad (1)$$

$$Rf\text{—}(ZW_\beta)_2 \quad (2)$$

$$Z'\text{—}(Rf\text{—}ZW_\beta)_\gamma \quad (3)$$

$$A\text{-}Rf\text{-}Q\text{-}(Y)_\delta\text{—}B \quad (4)$$

$$Rf\text{-}(Q\text{-}(Y)_\delta\text{—}B)_2 \quad (5)$$

In formulae (1) to (5), Rf is a divalent linear perfluorooxyalkylene polymer residue of the formula: —(CF$_2$)$_d$—O—(CF$_2$O)$_p$(CF$_2$CF$_2$O)$_q$(CF$_2$CF$_2$CF$_2$O)$_r$-(CF$_2$CF$_2$CF$_2$CF$_2$O)$_s$(CF(CF$_3$)CF$_2$O)$_t$—(CF$_2$)$_d$—, wherein p, q, r, s, and t are each independently an integer of 0 to 200, p+q+r+s+t is 3 to 500, each repeating unit in parentheses with subscripts p, q, r, s, and t may be randomly arranged, d is independently an integer of 0 to 8, the unit with d may be linear or branched. "A" is fluorine, hydrogen or a monovalent fluorinated group terminated with —CF$_3$, —CF$_2$H or —CH$_2$F group, Z and Z' are each independently a single bond, or a di- to octavalent organic group which may contain nitrogen, oxygen, silicon, phosphorus or sulfur and which may be fluorinated, W is a monovalent organic group terminated with a hydrolyzable group. The subscripts α and β are each independently an integer of 1 to 7, preferably α is an integer of 1 to 3, more preferably 1, β is an integer of 1 to 3, α+β is an integer of 2 to 8, preferably an integer of 2 to 4, and γ is an integer of 2 to 8, preferably 2 or 3.

Q is a single bond or divalent organic group, δ is independently an integer of 1 to 10, Y is a divalent organic group having a hydrolyzable group, and B is hydrogen, C$_{1-4}$ alkyl or halogen.

In formulae (1) to (5), Rf is the above-described (poly)fluorooxyalkylene structure (divalent linear perfluorooxyalkylene polymer residue): —(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—(CF$_2$)$_d$—, examples of which are as illustrated above.

In formulae (1) and (4), "A" is fluorine, hydrogen or a monovalent fluorinated group terminated with —CF$_3$, —CF$_2$H or —CH$_2$F group. Examples of the monovalent fluorinated group terminated with —CF$_3$, —CF$_2$H or —CH$_2$F group include —CF$_3$, —CF$_2$CF$_3$, —CF$_2$CF$_2$CF$_3$, and —CH$_2$CF(CF$_3$)—OC$_3$F$_7$. Inter alia, —CF$_3$, —CF$_2$CF$_3$ and —CF$_2$CF$_2$CF$_3$ groups are preferred as A.

In formulae (1) to (3), Z and Z' are each independently a single bond, or a di- to octavalent organic group which may contain nitrogen, oxygen, silicon, phosphorus or sulfur and which may be fluorinated. The organic group may be represented by (L)$_e$-M wherein e is an integer of 1 to 7, preferably 1 to 3.

Herein L is a single bond, oxygen, sulfur or a divalent organic group. In formulae (1) to (3), L in Z is a linking group between Rf group and M group (or W group), and L in Z' is a linking group between M group (or Rf group) and Rf group. The divalent organic group is preferably an unsubstituted or substituted C$_{2-12}$ divalent organic group which may contain one or more selected from the group consisting of amide bond, ether bond, ester bond, diorganosilylene groups such as dimethylsilylene, and groups of the formula: —Si[OH][—(CH$_2$)$_f$—Si(CH$_3$)$_3$]— wherein f is an integer of 2 to 4, more preferably an unsubstituted or substituted C$_{2-12}$ divalent hydrocarbon group which may contain the foregoing structure.

Examples of the unsubstituted or substituted C$_{2-12}$ divalent hydrocarbon group include alkylene groups such as ethylene, propylene (trimethylene or methylethylene), butylene (tetramethylene or methylpropylene), hexamethylene, and octamethylene, arylene groups such as phenylene, and combinations of two or more such groups, such as alkylene-arylene groups. In these groups, some or all of carbon-bonded hydrogen atoms may be substituted by halogen atoms such as fluorine and iodine. Inter alia, unsubstituted or substituted C$_{2-4}$alkylene groups or phenylene groups are preferred.

Examples of the divalent organic group L include groups of the following structure, and combinations of two or more such groups.

[Chem. 32]

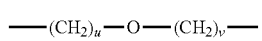
—(CH$_2$)$_u$—O—(CH$_2$)$_v$—

-continued

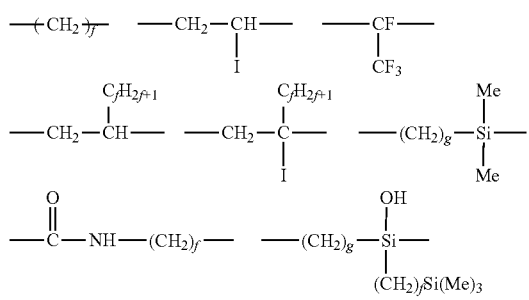

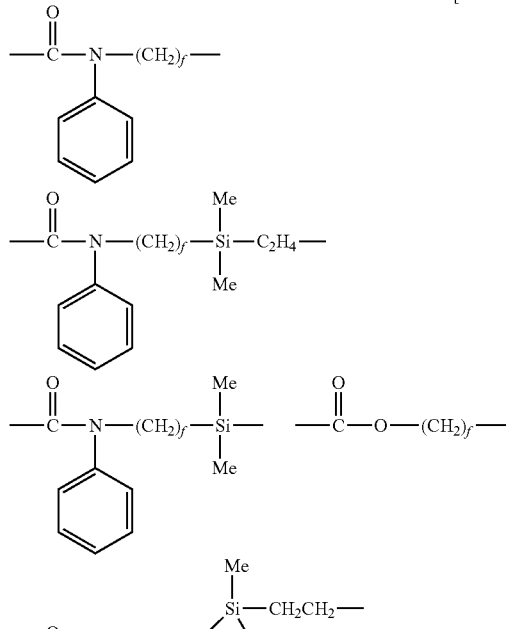

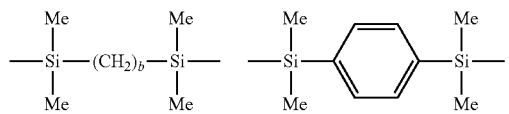

Herein f is an integer of 2 to 4, b is an integer of 2 to 6, preferably 2 to 4, u and v each are an integer of 1 to 4, g is an integer of 2 to 4, and Me is methyl.

Also, M is a single bond, nitrogen, silicon, carbon, phosphorus or a group containing such atom, or a di- to octavalent organic group. Specifically, M is a single bond, divalent group —$R^1{}_2C$—, divalent group —$R^3{}_2Si$—, divalent group —$NR^4$—, trivalent group —N≡, trivalent group —P≡, trivalent group —PO≡, trivalent group —$R^1C$≡, trivalent group —$R^3Si$≡, tetravalent group —C≡, tetravalent group —O—C≡, tetravalent group —Si≡, or di- to octavalent siloxane residues. In formulae (1) to (3), M in Z is a linking group between L (or Rf group) and W group, and M in Z' is a group to link with Rf group via L.

Herein, $R^1$ is each independently a $C_{1-3}$ alkyl group, hydroxyl group, group having repeating unit of $C_{1-3}$ oxyalkylene group which may have an intervening diorganosiloxane structure of 2 to 51 silicon atoms, or silyl ether group represented by $R^2{}_3SiO$—. $R^2$ is each independently hydrogen, a $C_{1-3}$ alkyl group, aryl group such as phenyl, or $C_{1-3}$ alkoxy group. $R^3$ is each independently a $C_{1-3}$ alkyl group, $C_2$ or $C_3$ alkenyl group, $C_{1-3}$ alkoxy group, or chloro. $R^4$ is a $C_{1-3}$ alkyl group or $C_{6-10}$ aryl group such as phenyl. When M is a siloxane residue, it preferably has a straight, branched or cyclic organopolysiloxane structure of 2 to 51 silicon atoms, preferably 2 to 13 silicon atoms, more preferably 2 to 11 silicon atoms, even more preferably 2 to 5 silicon atoms. The organopolysiloxane preferably has an unsubstituted or fluorinated alkyl group of 1 to 8 carbon atoms, more preferably 1 to 4 carbon atoms such as methyl, ethyl, propyl, butyl or $C_3F_7$—$C_3H_6$—, or phenyl group. The organopolysiloxane may also contain a silalkylene structure in which two silicon atoms are linked by an alkylene group, that is, Si—$(CH_2)_n$—Si wherein n is an integer of 2 to 6, preferably an integer of 2 to 4.

The following are exemplary of M defined above.

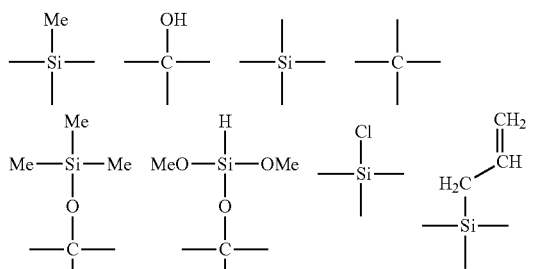

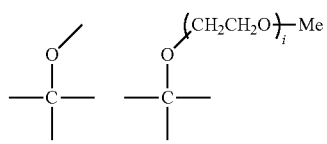

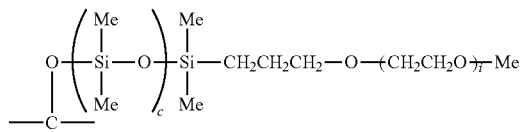

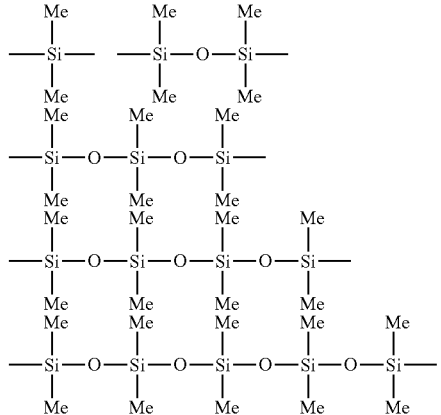

-continued

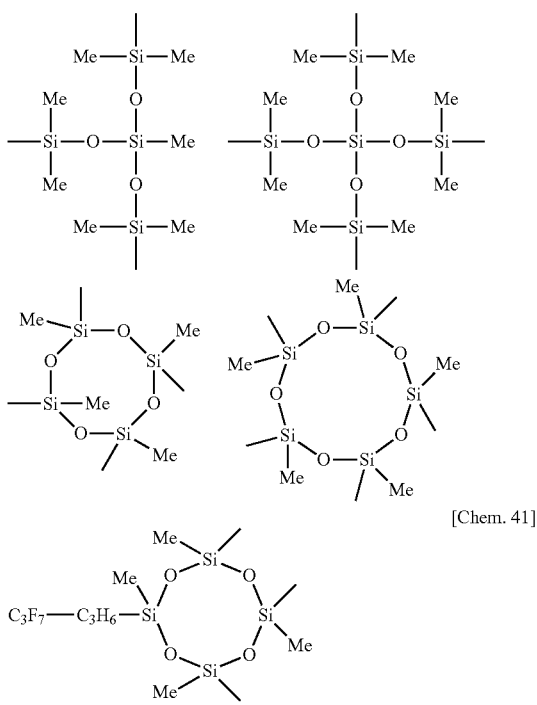
[Chem. 40]

3. The subscript m is an integer of 0 to 10, preferably an integer of 2 to 8, more preferably 2 or 3.

In formulae (1) to (3), examples of the structures represented by $(-)_\alpha ZW_\beta$ and $—ZW_\beta$ include the following structures.

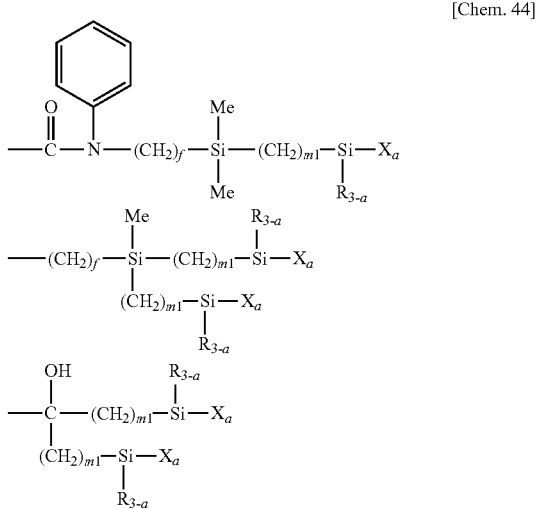
[Chem. 44]

[Chem. 41]

[Chem. 42]

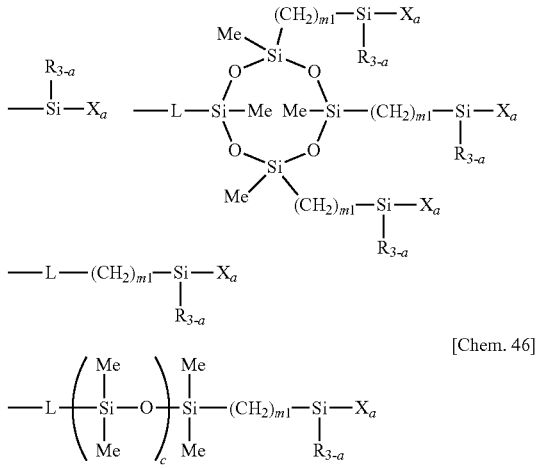
[Chem. 45]

[Chem. 46]

Herein i is an integer of 1 to 20, c is an integer of 1 to 50, and Me is methyl.

In formulae (1) to (3), W is a monovalent organic group terminated with a hydrolyzable group, preferably represented by the following formula.

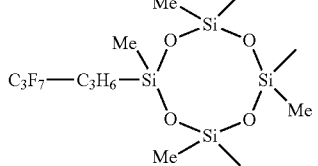
[Chem. 43]

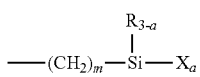

Herein R is $C_{1-4}$ alkyl or phenyl, X is a hydrolyzable group, a is 2 or 3, and m is an integer of 0 to 10.

In the above formula, examples of the hydrolyzable group X include $C_{1-12}$, preferably $C_{1-10}$ alkoxy groups such as methoxy, ethoxy, propoxy and butoxy, $C_{2-12}$, preferably $C_{2-10}$ alkoxyalkoxy groups such as methoxymethoxy and methoxyethoxy, $C_{1-10}$ acyloxy groups such as acetoxy, $C_{2-10}$ alkenyloxy groups such as isopropenoxy, halogen groups such as chloro, bromo and iodo, and amino groups. Inter alia, methoxy and ethoxy groups are preferred.

R is $C_{1-4}$ alkyl such as methyl or ethyl, or phenyl, with methyl being preferred.

The subscript "a" is 2 or 3. From the standpoints of reactivity and substrate adhesion, "a" is preferably equal to Herein, L, R, X, f, c, and a are as defined above; m1 is an integer of 1 to 10, preferably an integer of 2 to 8, and Me is methyl.

In formulae (4) and (5), Q is a single bond or divalent organic group, that is a linking group between Rf group and Y group. The divalent organic group represented by Q is preferably an unsubstituted or substituted $C_2$-12 divalent organic group which may contain at least one structure selected from amide bond, ether bond, ester bond, diorganosilylene groups such as dimethylsilylene, and groups represented by $—Si[OH][—(CH_2)_f—Si(CH_3)_3]—$ wherein f is an integer of 2 to 4, more preferably an unsubstituted or substituted $C_{2-12}$ divalent hydrocarbon group which may contain the aforementioned structure.

Examples of the unsubstituted or substituted $C_{2-12}$ divalent hydrocarbon group are as exemplified above for the unsubstituted or substituted $C_{2-12}$ divalent hydrocarbon group L.

Examples of the divalent organic group Q include groups of the following structure.

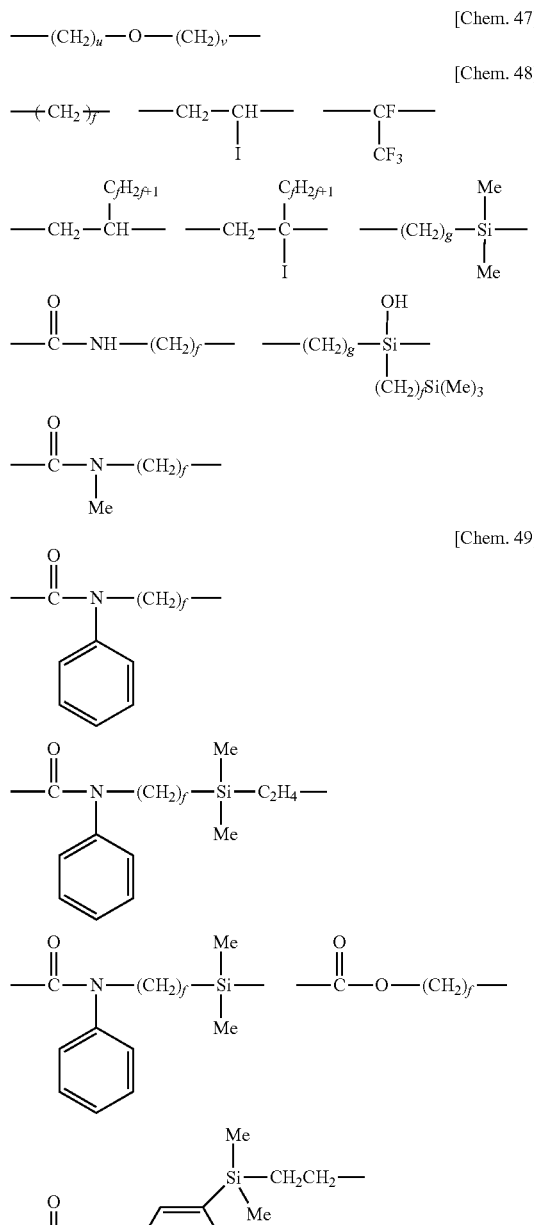

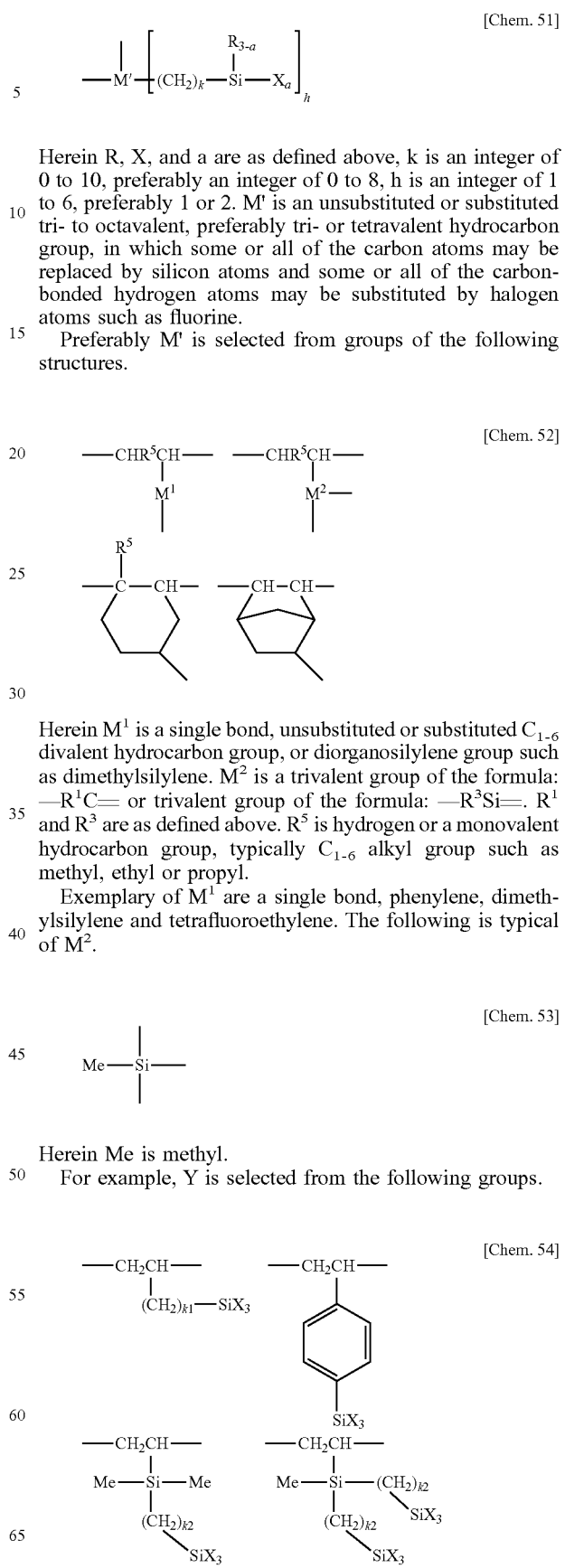

Herein f is an integer of 2 to 4, b is an integer of 2 to 6, preferably 2 to 4, u and v each are an integer of 1 to 4, g is an integer of 2 to 4, and Me is methyl.

In formulae (4) and (5), Y is each independently a divalent organic group having a hydrolyzable group, preferably a group of the following formula.

Herein R, X, and a are as defined above, k is an integer of 0 to 10, preferably an integer of 0 to 8, h is an integer of 1 to 6, preferably 1 or 2. M' is an unsubstituted or substituted tri- to octavalent, preferably tri- or tetravalent hydrocarbon group, in which some or all of the carbon atoms may be replaced by silicon atoms and some or all of the carbon-bonded hydrogen atoms may be substituted by halogen atoms such as fluorine.

Preferably M' is selected from groups of the following structures.

Herein $M^1$ is a single bond, unsubstituted or substituted $C_{1-6}$ divalent hydrocarbon group, or diorganosilylene group such as dimethylsilylene. $M^2$ is a trivalent group of the formula: —$R^1C$= or trivalent group of the formula: —$R^3Si$=. $R^1$ and $R^3$ are as defined above. $R^5$ is hydrogen or a monovalent hydrocarbon group, typically $C_{1-6}$ alkyl group such as methyl, ethyl or propyl.

Exemplary of $M^1$ are a single bond, phenylene, dimethylsilylene and tetrafluoroethylene. The following is typical of $M^2$.

Herein Me is methyl.

For example, Y is selected from the following groups.

-continued

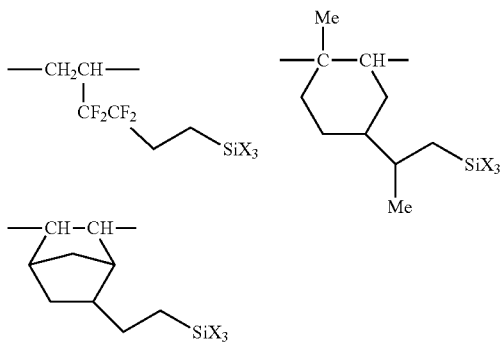

Herein X is as defined above, k1 is an integer of 0 to 10, preferably an integer of 0 to 8, k2 is an integer of 2 to 10, preferably an integer of 2 to 8, and Me is methyl.

In formulae (4) and (5), δ is an integer of 1 to 10, preferably an integer of 1 to 4.

B is each independently selected from hydrogen, $C_{1-4}$ alkyl groups such as methyl, ethyl, propyl and butyl, and halogen atoms such as fluorine, chlorine, bromine and iodine.

Examples of the hydrolyzable fluorinated organosilicon compounds (hydrolyzable fluorine-containing organosilicon compounds) having formulae (1) to (5) include the structures shown below.

[Chem. 56]

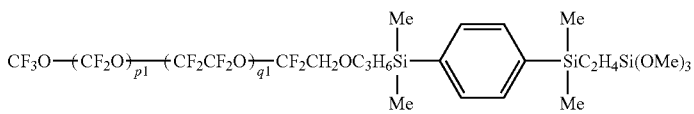
[Chem. 57]

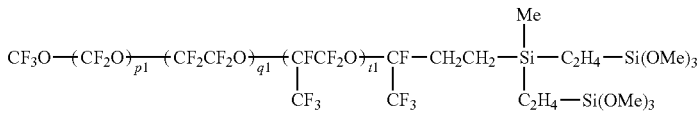
[Chem. 58]

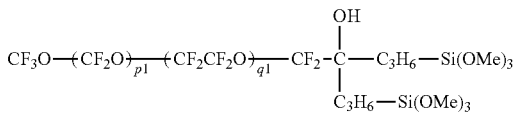
[Chem. 59]

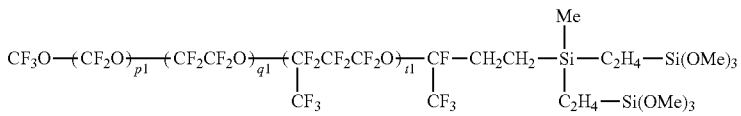
[Chem. 60]

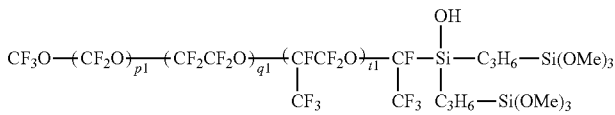
[Chem. 61]

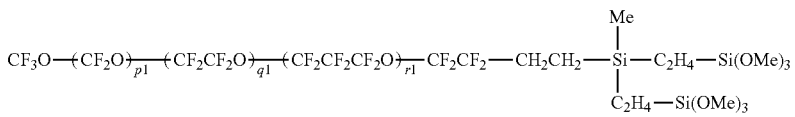
[Chem. 62]

[Chem. 63]

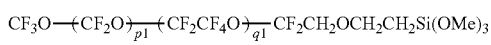

[Chem. 64]

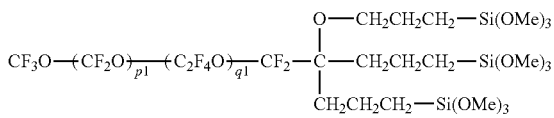

[Chem. 65]

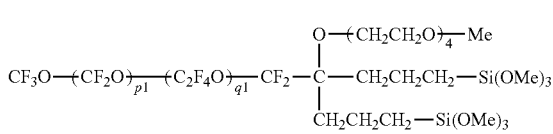

-continued
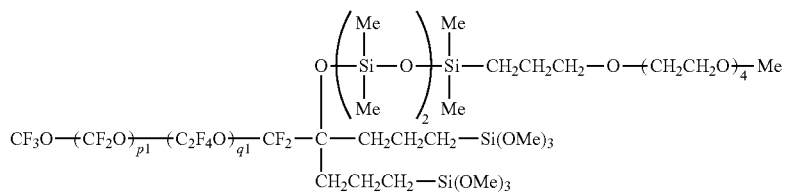
[Chem. 66]
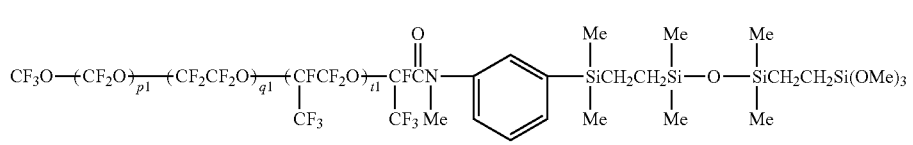
[Chem. 67]
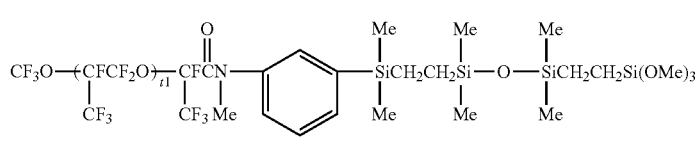
[Chem. 68]
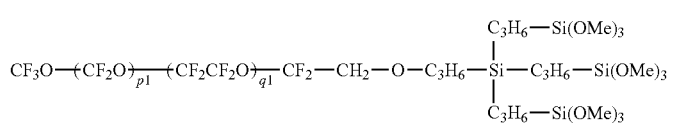
[Chem. 69]
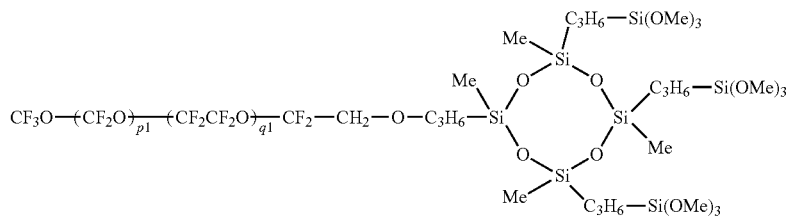
[Chem. 70]
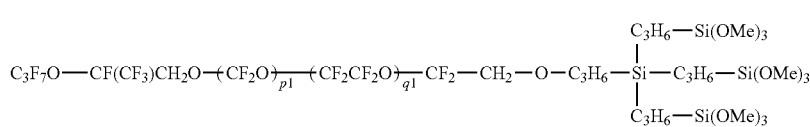
[Chem. 71]
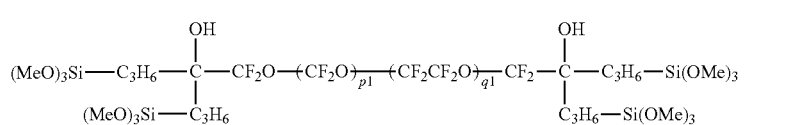
[Chem. 72]
[Chem. 73]

[Chem. 74]
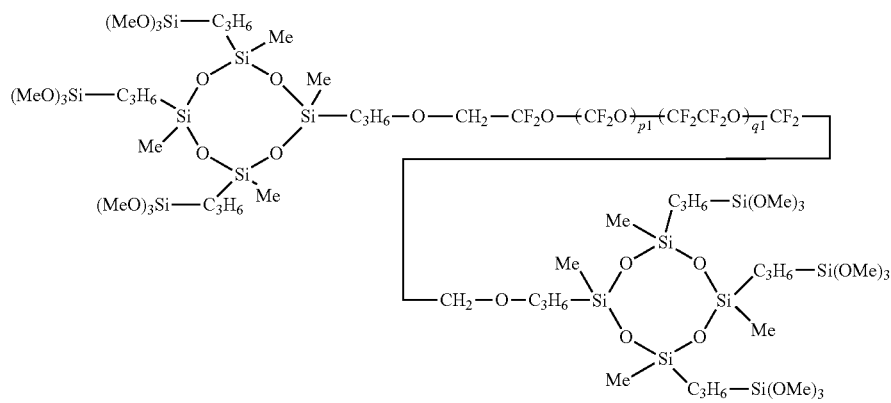
[Chem. 75]
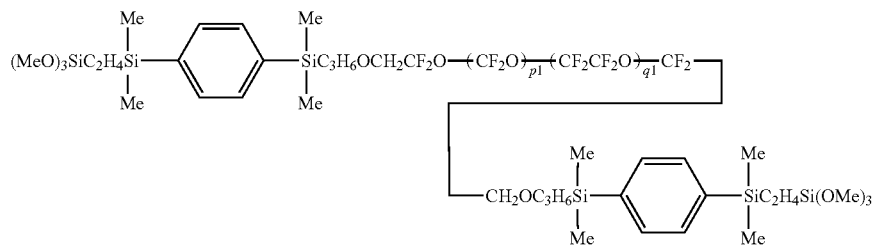
[Chem. 76]
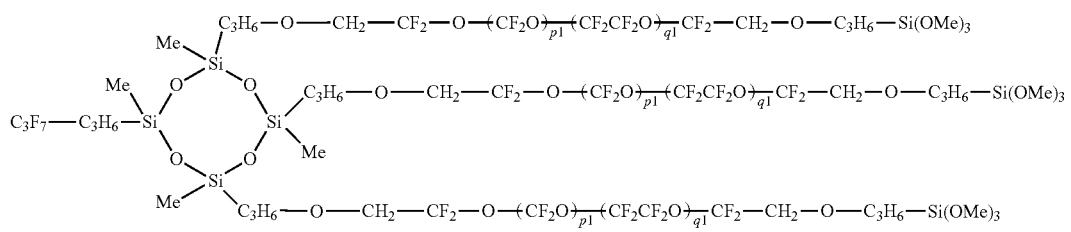
[Chem. 77]
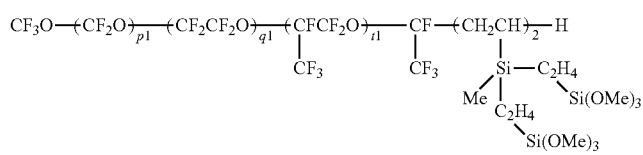
[Chem. 78]
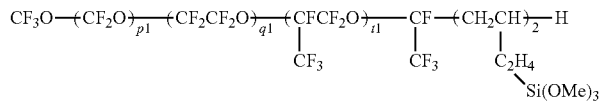
[Chem. 79]
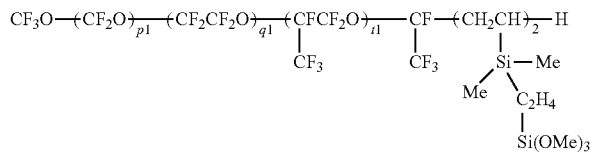
[Chem. 80]
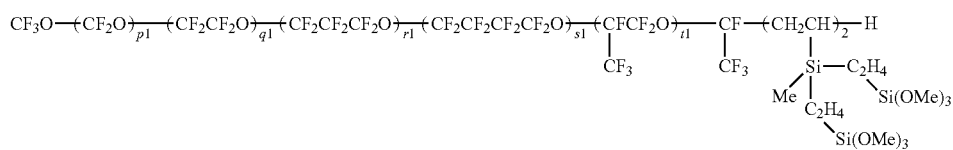

-continued

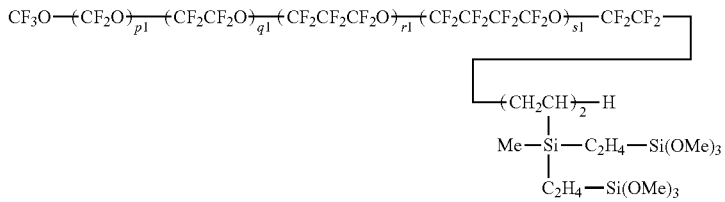
[Chem. 81]

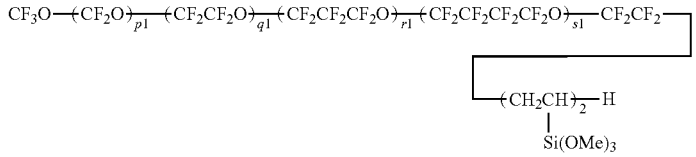
[Chem. 82]

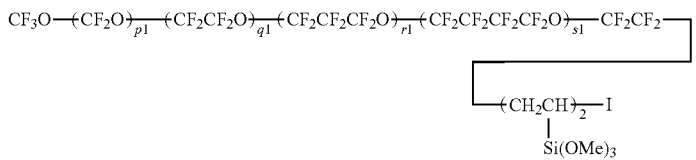
[Chem. 83]

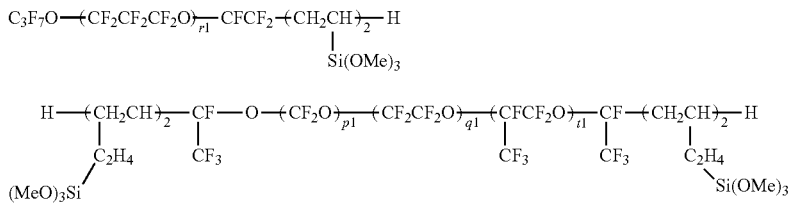
[Chem. 84]

[Chem. 85]

Herein Me is methyl, p1, q1, r1, s1, and t1 are each independently an integer of 1 to 200, the sum of p1, q1, r1, s1, and t1 is 3 to 500, each unit in parentheses with subscripts p1, q1, r1, s1, and t1 may be randomly arranged.

Of the hydrolyzable fluorinated organosilicon compounds (hydrolyzable fluorine-containing organosilicon compounds) having formulae (1) to (5), compounds having a hydrolyzable group at one end are preferred.

The hydrolyzable fluorinated organosilicon compound (hydrolyzable fluorine-containing organosilicon compound) having any of formulae (1) to (5) may contain such compounds in which some or all of the hydrolyzable groups (X) are hydrolyzed, that is, X is OH group and may further contain such compounds in which some or all of the OH groups are condensed. On use of a compound having a hydrolyzable group at one end selected from the hydrolyzable fluorinated organosilicon compounds (hydrolyzable fluorine-containing organosilicon compounds) having formulae (1) to (5), since the process of preparing the hydrolyzable organosilicon compound containing fluorine at one end can be accompanied, for example, by formation of a polymer containing hydrolyzable groups at both ends and a nonfunctional polymer as by-products, the containment of such polymers other than the single end functional organosilicon compound is acceptable. In this case, the component not participating in cure, typically non-functional polymer among the by-product polymers of the preparation process may be present in an amount of up to 50% by weight (i.e., 0 to 50% by weight), more preferably 0 to 45% by weight based on the total weight of the by-product and the hydrolyzable fluorinated organosilicon compound having any of formulae (1) to (5).

Desirably the hydrolyzable fluorinated compound is previously diluted with a solvent. The solvent used herein is not particularly limited as long as the hydrolyzable fluorinated compound is uniformly dissolved. Examples include fluorine-modified aliphatic hydrocarbon solvents (e.g., perfluoroheptane and perfluorooctane), fluorine-modified aromatic hydrocarbon solvents (e.g., 1,3-trifluoromethylbenzene), fluorine-modified ether solvents (e.g., methyl perfluorobutyl ether, ethyl perfluorobutyl ether, perfluoro(2-butyltetrahydrofuran)), fluorine-modified alkylamine solvents (e.g., perfluorotributylamine, perfluorotripentylamine), hydrocarbon solvents (e.g., petroleum benzine, toluene, xylene), and ketone solvents (e.g., acetone, methyl ethyl ketone, methyl isobutyl ketone). Of these, fluorine-modified solvents are desirable for solubility and stability, and fluorine-modified ether solvents and fluorine-modified aromatic hydrocarbon solvents are especially preferred.

The foregoing solvents may be used alone or in admixture.

The solvent is preferably used in such amounts that the concentration of the hydrolyzable fluorinated compound may fall in a range of 0.01 to 50% by weight, more preferably 0.03 to 10% by weight, even more preferably 0.05 to 1% by weight of the release agent (solution of the hydrolyzable fluorinated compound in the solvent).

The release agent containing the hydrolyzable fluorinated compound (i.e., solution of the hydrolyzable fluorinated compound in the solvent) may be applied to substrates by any well-known processes such as wet coating processes (e.g., dipping, brush coating, spin coating, spraying, gravure coating, die coating, bar coating, and slit coating) and evaporation. Coating and other conditions may accord with the prior art well-known process. Exemplary are one process including the steps of wet coating the release agent (i.e., solution of the hydrolyzable fluorinated compound in the solvent) and drying the solvent, and another process including the steps of providing the release agent (i.e., solution of the hydrolyzable fluorinated compound in the solvent), evaporating off the solvent, and dry coating the remaining hydrolyzable fluorinated compound. The wet coating process including the steps of wet coating the release agent containing the hydrolyzable fluorinated compound (i.e., solution of the hydrolyzable fluorinated compound in the solvent) is more efficient because the primer layer is deposited by the wet coating process.

It is noted that the surface of the primer layer on the substrate may be cleaned or activated by plasma treatment, UV treatment or ozone treatment before the release agent containing the hydrolyzable fluorinated compound is coated thereon.

The hydrolyzable fluorinated compound (release agent) may be cured at room temperature (25° C.) for 1 to 24 hours. Cure may be completed within a shorter time by heating at 30 to 200° C. for 1 minute to 1 hour. Cure under humid conditions (RH 50 to 90%) is preferred for accelerating hydrolysis.

The fluorinated layer or release layer which is the second layer of the inventive release film adapted for silicone PSA is composed mainly of a cured product of the hydrolyzable fluorinated compound (hydrolyzable fluorine-containing organosilicon compound). Preferably the cured product accounts for at least 50% by weight (i.e., 50 to 100% by weight), more preferably 55 to 100% by weight of the release layer.

The fluorinated layer or release layer which is the second layer of the inventive release film adapted for silicone PSA has a thickness of 0.5 to 30 nm, preferably 1 to 20 nm. If the layer is too thick, the treating agent may agglomerate together to increase migrating components to the silicone PSA, exacerbating the residual adhesion (or re-bonding force) of the silicone PSA after release. If the layer is too thin, release properties may be insufficient.

The inventive release film thus obtained is useful in a variety of applications as release film for silicone PSAs such as PSA tapes and PSA sheets, and can also be used as protective film for various displays and masking members and adhesive securing members for electronic parts.

EXAMPLES

Examples and Comparative Examples are shown below for further illustrating the invention although the invention is not limited thereby. Me stands for methyl.

Examples 1 to 6 and Comparative Example 1

[Formation of Primer Layer]

A polyethylene terephthalate film substrate (Toray Industries, Inc., Lumirror S10, 50 µm thick, 300 mm wide, 330 mm long) was coated on one surface with a treating liquid of a hydrolytic partial condensate of tetraethoxysilane (Mw 25,000, silanol content 0.01 mol/g) diluted with butanol in a concentration of 0.5 wt % as solids by means of K Control Coater model 202 with coating bar No. 1, and heated in a hot air circulating dryer at 120° C. for 60 seconds, yielding a primer layer-bearing film. The primer layer had an average thickness of ~30 nm as computed from the Si content detected by an X-ray fluorescence spectrometer (ZSXmini2 by Rigaku Corp.).

Then a release layer was formed on the primer layer of the primer layer-bearing film by the following procedure.

[Formation of Release Layer]

Each of Compounds 1 to 5 shown below was diluted with a fluorine-modified ether solvent (ethyl perfluorobutyl ether, Novec 7200 by 3M) in a concentration of 0.1 wt % as solids. Using a spray coater (NST-51 by T&K Co., Ltd.), the dilution was sprayed onto the outer surface of the primer layer on the substrate. The coating was cured at 80° C. for 30 minutes to form a cured film (or release layer), yielding a release film (specimen). The release layer had an average thickness of ~8 to ~10 nm as computed from the F content detected by X-ray fluorescence spectrometer (ZSXmini2 by Rigaku Corp.).

[Compound 1]

Compound 1 is a mixture of fluorinated compounds shown below (mixture of three components: component containing hydrolyzable silyl group at one end (single end component), component containing hydrolyzable silyl group at both ends (double end component), and component free of hydrolyzable silyl group (non-functional component). Table 1 shows the composition or mixing ratio of components.

[Chem. 86]

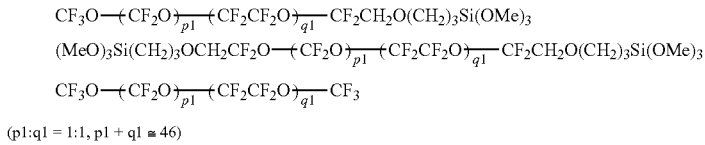

$CF_3O{-}(CF_2O)_{\overline{p1}}(CF_2CF_2O)_{\overline{q1}}{-}CF_2CH_2O(CH_2)_3Si(OMe)_3$ $(MeO)_3Si(CH_2)_3OCH_2CF_2O{-}(CF_2O)_{\overline{p1}}(CF_2CF_2O)_{\overline{q1}}{-}CF_2CH_2O(CH_2)_3Si(OMe)_3$ $CF_3O{-}(CF_2O)_{\overline{p1}}(CF_2CF_2O)_{\overline{q1}}{-}CF_3$ (p1:q1 = 1:1, p1 + q1 ≅ 46)

[Compound 2]

Compound 2 is a mixture of fluorinated compounds shown below (mixture of three components: component containing hydrolyzable silyl group at one end (single end component), component containing hydrolyzable silyl group at both ends (double end component), and component free of hydrolyzable silyl group (non-functional component). Table 1 shows the composition or mixing ratio of components.

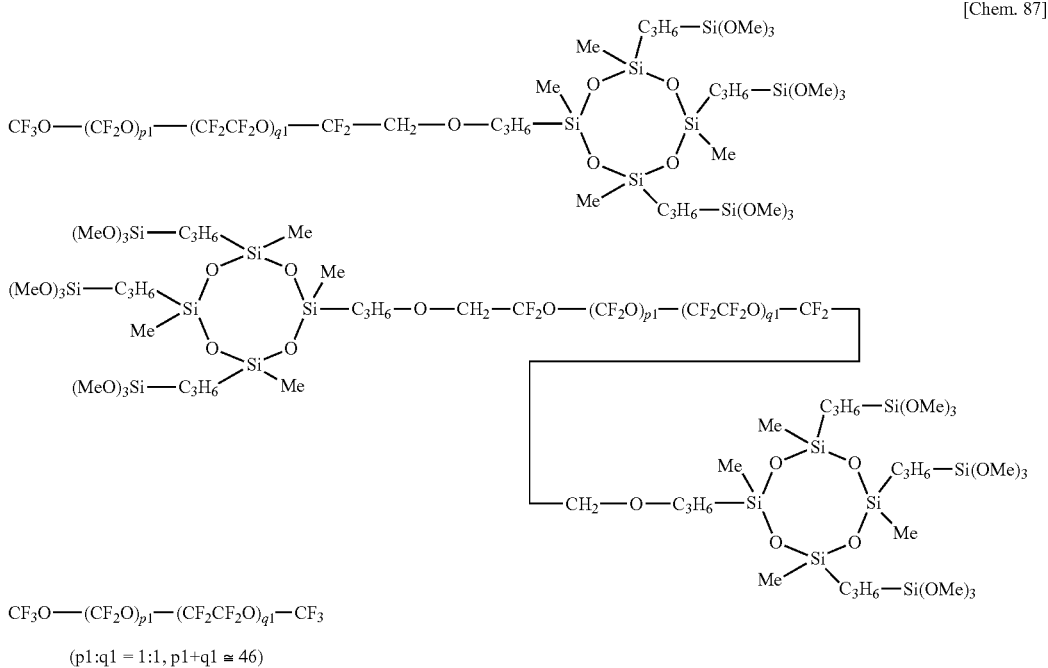

[Compound 3]

Compound 3 is a mixture of fluorinated compounds shown below (mixture of three components: component containing hydrolyzable silyl group at one end (single end component), component containing hydrolyzable silyl group at both ends (double end component), and component free of hydrolyzable silyl group (non-functional component). Table 1 shows the composition or mixing ratio of components.

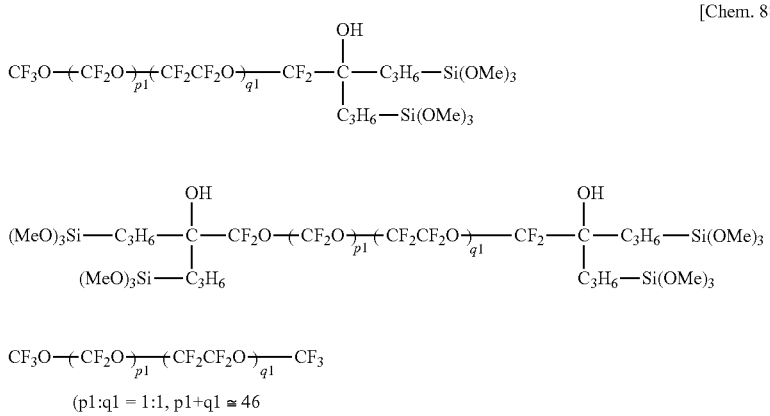

[Compound 4]

Compound 4 is a mixture of fluorinated compounds shown below (mixture of three components: component containing hydrolyzable silyl group at one end (single end component), component containing hydrolyzable silyl group at both ends (double end component), and component free of hydrolyzable silyl group (non-functional component). Table 1 shows the composition or mixing ratio of components.

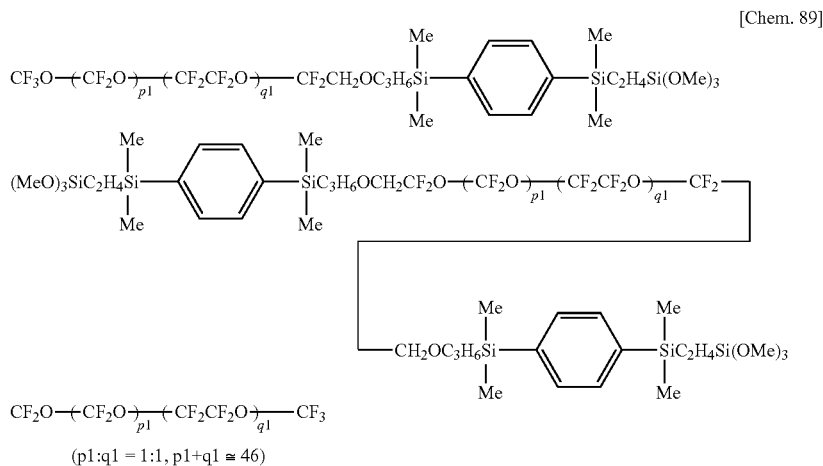

[Compound 5]
Hydrolyzable fluorinated compound shown below.

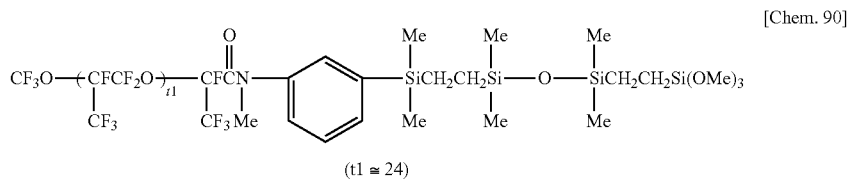

TABLE 1

| | Compound | Compositional ratio (wt %) | | |
|---|---|---|---|---|
| | | Single end | Double end | Non-functional |
| Example 1 | 1 | 45 | 10 | 45 |
| Example 2 | 2 | 52 | 13 | 35 |
| Example 3 | 3 | 50 | 25 | 25 |
| Example 4 | 4 | 48 | 12 | 40 |
| Example 5 | 5 | 100 | — | — |

[Formation of Release Layer in Comparative Example 1]

A treating liquid was prepared by diluting 4 parts by weight of a silicone PSA-oriented release agent X-70-201S (Shin-Etsu Chemical Co., Ltd., release agent for addition curable silicone PSA, silanol content 0 mol/g) with 96 parts by weight of solvent Novec 7300 (3M) and adding 0.05 part by weight of a chloroplatinic acid-vinylsiloxane complex salt (Pt concentration 2 wt %) thereto.

The treating liquid was coated onto the primer layer on the substrate by means of K Control Coater model 202 with coating bar No. 1, and heated in a hot air circulating dryer at 150° C. for 60 seconds to form a cured coating (coating weight~0.3 g/m$^2$), yielding a release film (specimen). The primer layer had an average thickness of ~30 nm as computed from the Si content detected by X-ray fluorescence spectrometer (ZSXmini2 by Rigaku Corp.).

The release films (specimens) were evaluated for some properties by the following methods. The results are shown in Tables 2 and 3.

[Release Force]

A silicone-based PSA tape of 25 mm wide (Kapton No. 650S #25 by Teraoka Seisakusho Co., Ltd.) was attached to the release film and aged in the attached state under a load of 25 g/cm$^2$ at 70° C. for 1 to 21 days. Using a tensile tester, the tape was pulled back at an angle of 180° and a peel rate of 0.3 m/min. A force (N/25 mm) required for peeling was measured.

[Re-Bonding Force]

The PSA tape after the peel test was attached to a stainless steel (SUS) plate, press bonded thereto by once rolling back and forth a roller of 2 kg, and allowed to stand for 30 minutes. Using a tensile tester, the PSA tape was pulled back at an angle of 180° and a peel rate of 0.3 m/min. A force (N/25 mm) required for peeling was measured.

TABLE 2

| | Peeling force (N/25 mm) | | | | Re-bonding force (N/25 mm) | | | |
|---|---|---|---|---|---|---|---|---|
| | 1 day | 7 days | 14 days | 21 days | 1 day | 7 days | 14 days | 21 days |
| Example 1 | 0.03 | 0.04 | 0.05 | 0.08 | 3.97 | 3.20 | 3.07 | 3.01 |
| Comparative Example 1 | 0.14 | 0.25 | 0.40 | 0.65 | 5.72 | 5.55 | 5.41 | 5.23 |

TABLE 3

| | Peeling force (N/25 mm) 1 day | Re-bonding force (N/25 mm) 1 day |
|---|---|---|
| Example 2 | 0.25 | 4.18 |
| Example 3 | 2.27 | 5.71 |
| Example 4 | 0.08 | 4.36 |
| Example 5 | 0.71 | 3.68 |

As seen from the data in Table 2, Example 1 shows better easy-release performance and a smaller change with time of peeling force than Comparative Example 1. As seen from the data in Table 3, easy or tight-release properties appropriate for a particular purpose are obtained by a suitable choice of the hydrolyzable fluorinated compound of which the release layer or second layer is composed.

INDUSTRIAL APPLICABILITY

The inventive release film having improved release properties is useful in a variety of applications as release film for silicone PSAs such as PSA tapes and PSA sheets, and can be used as protective film for various displays and masking members and adhesive securing members for electronic parts.

The invention claimed is:

1. A release film adapted for silicone pressure-sensitive adhesive, comprising a substrate, a primer layer disposed on at least one surface of the substrate as a first layer, and a release layer disposed on the outer surface of the primer layer as a second layer,
   the substrate having a thickness of 10 to 200 μm,
   the primer layer comprising an organosilicon compound having a plurality of silanol groups per molecule and having a thickness of 0.5 to 500 nm,
   the release layer comprising a cured product of a hydrolyzable fluorinated compound and having a thickness of 0.5 to 30 nm.

2. The release film of claim 1 wherein the organosilicon compound having a plurality of silanol groups per molecule is a hydrolytic partial condensate of a tetraalkoxysilane.

3. The release film of claim 1 wherein the hydrolyzable fluorinated compound has at least one hydrolyzable silyl group at one or more molecular chain ends, the hydrolyzable silyl group being selected from among silyl groups having $C_{1-12}$ alkoxy, $C_{2-12}$ alkoxyalkoxy, $C_{1-10}$ acyloxy, $C_{2-10}$ alkenyloxy, halogen or amino, and silazane groups.

4. The release film of claim 1 wherein the hydrolyzable fluorinated compound is a fluorooxyalkylene group-containing organosilicon compound having per molecule a divalent linear perfluorooxyalkylene polymer residue: $-(CF_2)_d-O-(CF_2O)_p(CF_2CF_2O)_q(CF_2CF_2CF_2O)_r(CF_2CF_2CF_2CF_2O)_s(CF(CF_3)CF_2O)_t-(CF_2)_d-$ wherein p, q, r, s and t are each independently an integer of 0 to 200, p+q+r+s+t is 3 to 500, each repeating unit in parentheses with subscripts p, q, r, s and t may be randomly arranged, d is independently an integer of 0 to 8, the unit with d may be linear or branched, the organosilicon compound further having at least one hydrolyzable silyl group at one or more molecular chain ends.

5. The release film of claim 1 wherein the hydrolyzable fluorinated compound is at least one compound selected from hydrolyzable fluorinated organosilicon compounds having the general formulae (1) to (5):

$$(A-Rf)_\alpha-ZW_\beta \quad (1)$$

$$Rf-(ZW_\beta)_2 \quad (2)$$

$$Z'-(Rf-ZW_\beta)_\gamma \quad (3)$$

wherein Rf is a divalent linear perfluorooxyalkylene polymer residue: $(CF_2)_d-O-(CF_2O)_p(CF_2CF_2O)_q(CF_2CF_2CF_2O)_r(CF_2CF_2CF_2CF_2O)_s(CF(CF_3)CF_2O)_t-(CF_2)_d-$, p, q, r, s, and t are each independently an integer of 0 to 200, p+q+r+s+t is 3 to 500, each repeating unit in parentheses with subscripts p, q, r, s and t may be randomly arranged, d is independently an integer of 0 to 8, the unit with d may be linear or branched, A is fluorine, hydrogen or a monovalent fluorinated group terminated with $-CF_3$, $-CF_2H$ or $-CH_2F$ group, Z and Z' are each independently a single bond, or a di- to octavalent organic group which may contain nitrogen, oxygen, silicon, phosphorus or sulfur and which may be fluorinated, W is a monovalent organic group terminated with a hydrolyzable group, α and β are each independently an integer of 1 to 7, α+β is 2 to 8, and γ is an integer of 2 to 8, $$A-Rf-Q-(Y)_\delta-B \quad (4)$$

$$Rf-(Q-(Y)_\delta-B)_2 \quad (5)$$

wherein Rf and A are as defined above, Q is a single bond or divalent organic group, δ is each independently an integer of 1 to 10, Y is a divalent organic group having a hydrolyzable group, and B is hydrogen, $C_{1-4}$ alkyl or halogen.

6. The release film of claim 5 wherein the hydrolyzable fluorinated organosilicon compounds are the following:

[Chem. 1]

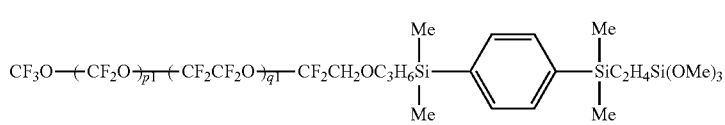

[Chem. 2]

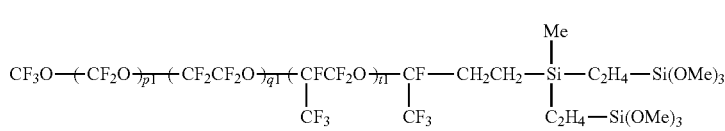

[Chem. 3]

-continued
[Chem. 4]
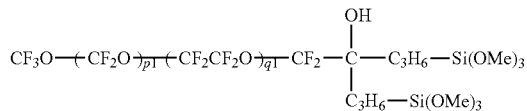
[Chem. 5]
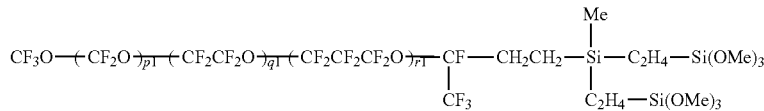
[Chem. 6]
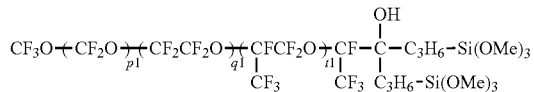
[Chem. 7]
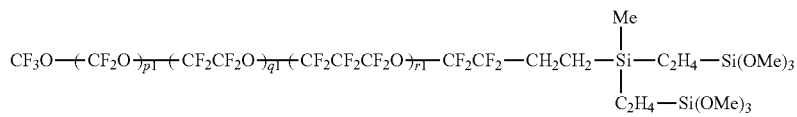
[Chem. 8]
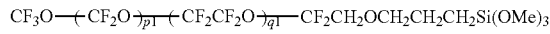
[Chem. 9]
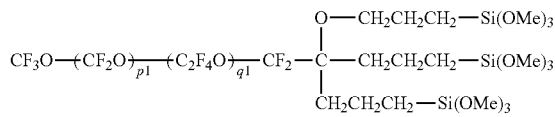
[Chem. 10]
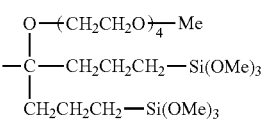
[Chem. 11]
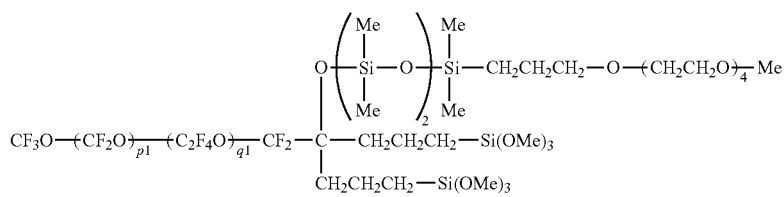
[Chem. 12]
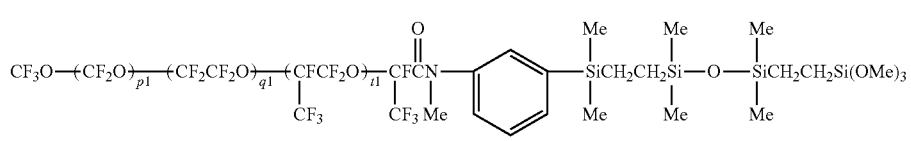
[Chem. 13]
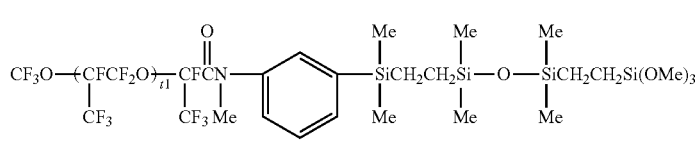
[Chem. 14]
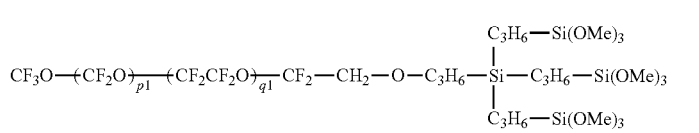
[Chem. 15]
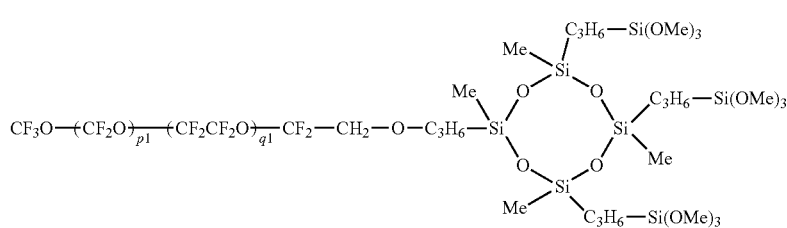

[Chem. 16]
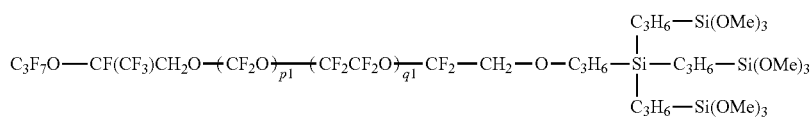
[Chem. 17]
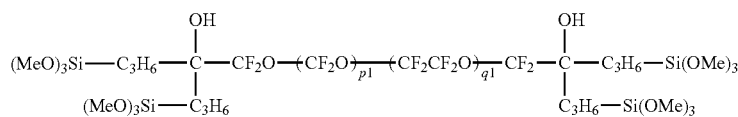
[Chem. 18]
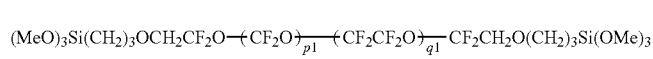
[Chem. 19]
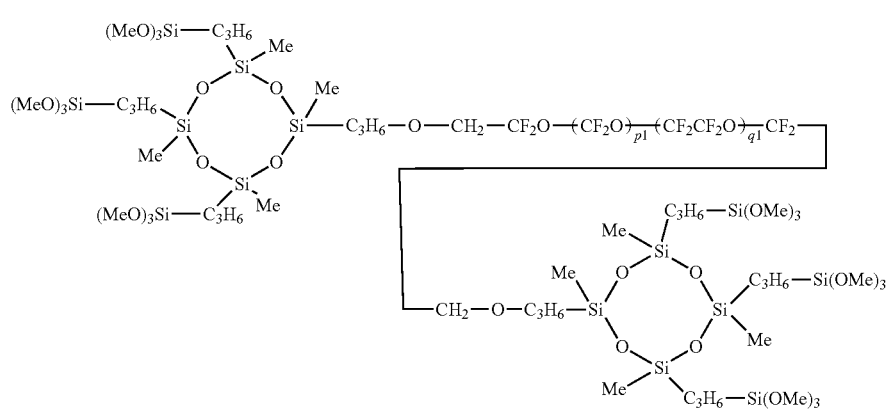
[Chem. 20]
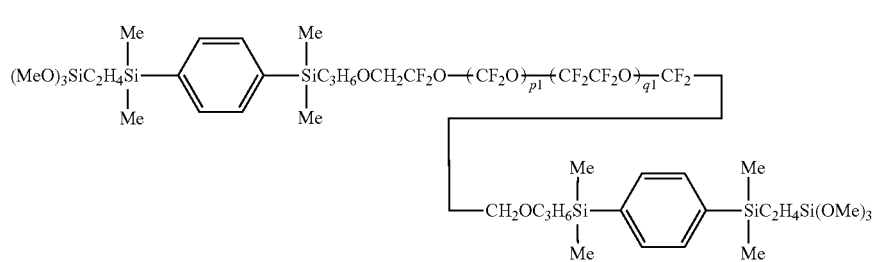
[Chem. 21]
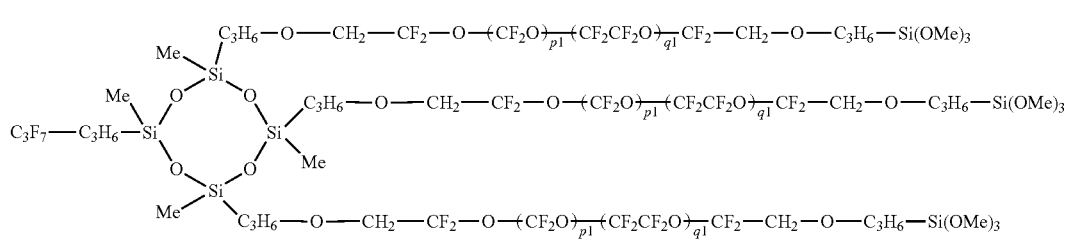
[Chem. 22]
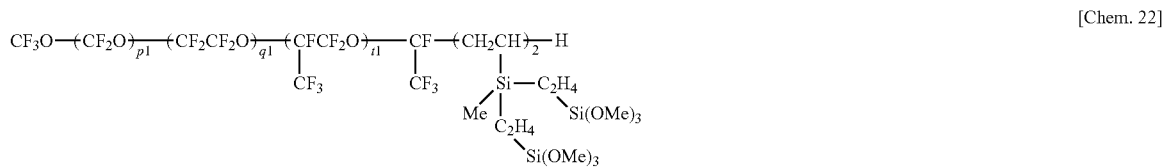
[Chem. 23]
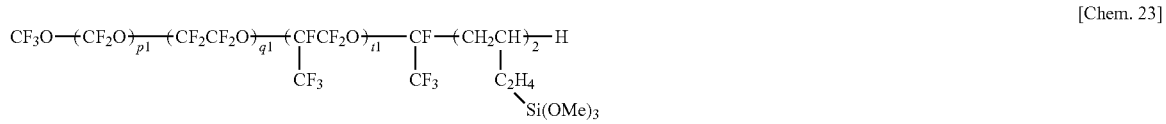

-continued

[Chem. 24]
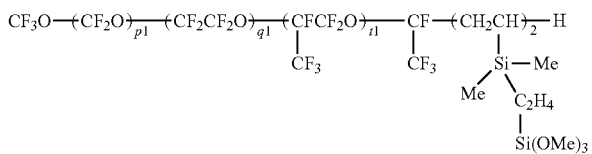

[Chem. 25]
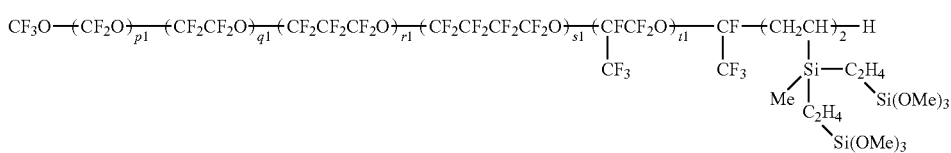

[Chem. 26]
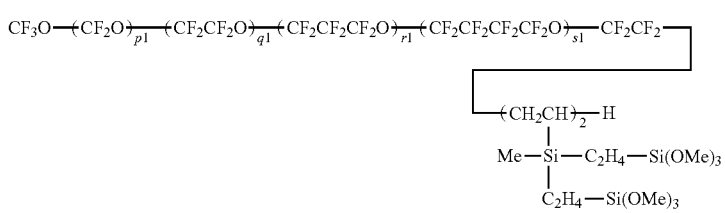

[Chem.27]
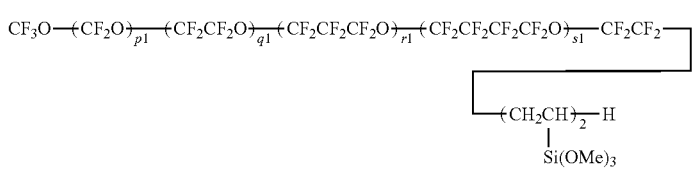

[Chem. 28]
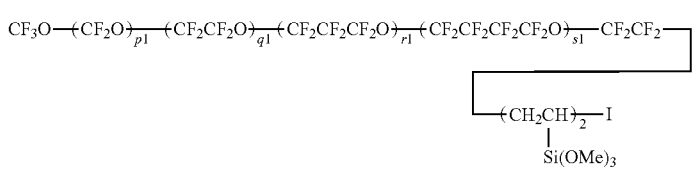

[Chem. 29]
$C_3F_7O-(CF_2CF_2CF_2O)_{\overline{r1}}-CFCF_2-(CH_2CH)_{\overline{2}}-H$
                                              |
                                              $Si(OMe)_3$

[Chem. 30]
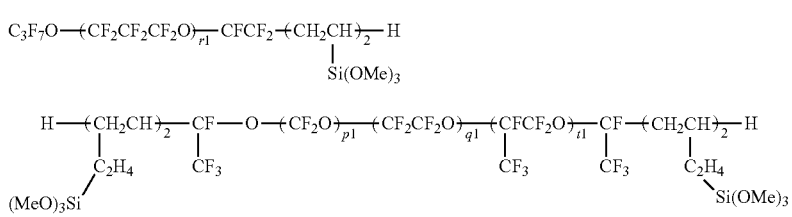

wherein Me is methyl, p1, q1, r1, s1, and t1 are each independently an integer of 1 to 200, the sum of p1, q1, r1, s1, and t1 is 3 to 500, each unit in parentheses with subscripts p1, q1, r1, s1, and t1 may be randomly arranged.

7. The release film of claim 1 wherein the release layer contains the cured product of a hydrolyzable fluorinated compound and a nonfunctional fluorinated compound.

8. The release film of claim 1 wherein the substrate is of a resin, paper or metal.

9. A method for preparing the release film of claim 1, comprising the steps of:
  wet coating a solution of an organosilicon compound having a plurality of silanol groups per molecule in a solvent onto at least one surface of a substrate,
  drying the solvent to form and lay a primer layer on the at least one surface of a substrate,
  wet coating a solution of a hydrolyzable fluorinated compound in a solvent onto the outer surface of the primer layer and then drying the solvent, or providing a solution of a hydrolyzable fluorinated compound in a solvent, evaporating off the solvent, and dry coating the hydrolyzable fluorinated compound to the outer surface of the primer layer, and
  curing the hydrolyzable fluorinated compound to form and lay a release layer on the outer surface of the primer layer.

10. The release film of claim 1 wherein the primer layer has a thickness of 30 to 500 nm.

11. The release film of claim 1 wherein the substrate is:
  a plastic film or sheet made of polyesters, polypropylene, polyethylene, polyvinyl chloride, polytetrafluoroethylene or polyimides;
  a paper substrate;
  a laminated paper substrate; or
  a metal foil.

12. A layered structure comprising a release film adapted for silicone pressure-sensitive adhesive which comprises a substrate, a primer layer disposed on at least one surface of the substrate as a first layer, and a release layer disposed on the outer surface of the primer layer as a silicone second layer, and a pressure-sensitive adhesive disposed on the release layer of the release film, the primer layer comprising an organosilicon compound having a plurality of silanol groups per molecule and having a thickness of 0.5 to 500 nm, the release layer comprising a cured product of a hydrolyzable fluorinated compound and having a thickness of 0.5 to 30 nm.

* * * * *